US012755635B2

(12) United States Patent
Di Francesco

(10) Patent No.: US 12,755,635 B2
(45) Date of Patent: Oct. 6, 2026

(54) SYSTEMS, DEVICES AND METHODS FOR NOTIFYING A TARGET

(71) Applicants: Sony Group Corporation, Tokyo (JP); Sony Europe B.V., Surrey (GB)

(72) Inventor: Renaud Di Francesco, Basingstoke (SE)

(73) Assignee: Sony Group Corporation, Tokyo (JP)

( * ) Notice: Subject to any disclaimer, the term of this patent is extended or adjusted under 35 U.S.C. 154(b) by 452 days.

(21) Appl. No.: 18/009,719

(22) PCT Filed: Jun. 2, 2021

(86) PCT No.: PCT/GB2021/051362
§ 371 (c)(1),
(2) Date: Dec. 10, 2022

(87) PCT Pub. No.: WO2022/008863
PCT Pub. Date: Jan. 13, 2022

(65) Prior Publication Data

US 2023/0245565 A1 Aug. 3, 2023

(30) Foreign Application Priority Data

Jul. 9, 2020 (GB) ...................................... 2010594

(51) Int. Cl.
*G08G 1/16* (2006.01)
*B60Q 9/00* (2006.01)
*G06V 20/58* (2022.01)

(52) U.S. Cl.
CPC ............. *G08G 1/166* (2013.01); *B60Q 9/008* (2013.01); *G06V 20/58* (2022.01); *G08G 1/162* (2013.01)

(58) Field of Classification Search
CPC ........ G08G 1/166; G08G 1/162; G08G 1/005; G08G 1/161; B60Q 9/008; B60Q 1/525; G06V 20/58; G05D 1/0289
See application file for complete search history.

(56) References Cited

U.S. PATENT DOCUMENTS

2013/0253809 A1 9/2013 Jones
2016/0163198 A1 6/2016 Dougherty
(Continued)

FOREIGN PATENT DOCUMENTS

JP 2008234414 A * 10/2008
JP 2016071492 A * 5/2016
(Continued)

OTHER PUBLICATIONS

International Search Report from and Written Opinion from corresponding International Application No. PCT/ GB2021/051362, mailed on Sep. 7, 2021, 15 pages.
(Continued)

*Primary Examiner* — Hunter B Lonsberry
*Assistant Examiner* — Henry R Hinton
(74) *Attorney, Agent, or Firm* — Tucker Ellis LLP

(57) ABSTRACT

A method of notifying a target that the target was a likely cause of an emergency action performed by a vehicle is provided. The method comprises monitoring, by control circuitry in the vehicle, one or more parameters of the vehicle indicating a motion of the vehicle, detecting, by the control circuitry based on the monitored parameters, that an emergency action has been performed by the vehicle to avoid a collision, identifying, by the control circuitry, that an object in a region surrounding the vehicle was a likely cause of the emergency action, the object being a notification target, causing, by the control circuitry in combination with transmitter circuitry in the vehicle, a notification to be
(Continued)

transmitted to at least one of a communication device of the notification target or a server indicating that the notification target was the likely cause of the emergency action.

19 Claims, 13 Drawing Sheets

(56) References Cited

U.S. PATENT DOCUMENTS

| | | | | |
|---|---|---|---|---|
| 2017/0243485 | A1* | 8/2017 | Rubin | H04W 4/46 |
| 2017/0256147 | A1* | 9/2017 | Shanahan | G08G 1/096741 |
| 2017/0352200 | A1* | 12/2017 | Wang | H04W 4/023 |
| 2018/0033306 | A1 | 2/2018 | Kim | |
| 2018/0075309 | A1* | 3/2018 | Sathyanarayana | G05D 1/0088 |
| 2018/0160419 | A1* | 6/2018 | Jiang | G01S 5/0027 |
| 2018/0165531 | A1 | 6/2018 | Sathyanarayana | |
| 2019/0256088 | A1* | 8/2019 | Sharma | G06V 10/764 |
| 2019/0365014 | A1 | 12/2019 | Andon | |
| 2024/0331395 | A1* | 10/2024 | Petrey, Jr. | G08B 31/00 |

FOREIGN PATENT DOCUMENTS

| | | | |
|---|---|---|---|
| WO | 2010134527 | A1 | 11/2010 |
| WO | 2015013240 | A1 | 1/2015 |
| WO | 2017080706 | A1 | 5/2017 |

OTHER PUBLICATIONS

Search Report from corresponding Application No. GB2010594.6, dated Dec. 9, 2020, 4 pages.

European Telecommunications Standard Institute (ETSI), "Non-IP Networking (NIN)", Jul. 2020, 4 pages.

* cited by examiner

SYSTEMS, DEVICES AND METHODS FOR NOTIFYING A TARGET

BACKGROUND

The present technique relates to systems, devices and methods for notifying a target that the target was a likely cause of an emergency action performed by a vehicle.

This application claims the Paris convention priority to UK patent application number 2010594.6, the contents of which are incorporated by reference in their entirety.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

With increased use and automatization of motor and electric vehicles, there is an increased requirement for improving pedestrian and driver safety. In recent years, there has been development of intelligent motor vehicles with advanced pedestrian safety mechanisms such as Automated Emergency Braking (AEB). With the aim of improving pedestrian and driver safety, there have been attempts for vehicles to communicate with pedestrians, cyclists and other vehicles with the development of Vehicle to Everything (V2X) and Vehicle to Pedestrian (V2P) technologies which may be Wireless Local Area Network (WLAN) based or cellular based.

SUMMARY OF DISCLOSURE

Embodiments of the present technique can provide a method of notifying a target that the target was a likely cause of an emergency action performed by a vehicle. The vehicle may be a human operated vehicle or an autonomous vehicle. The method includes monitoring, by control circuitry in the vehicle, one or more parameters of the vehicle indicating a motion of the vehicle; detecting, by the control circuitry based on the monitored parameters, that an emergency action has been performed by the vehicle to avoid a collision, identifying, by the control circuitry, that an object in a region surrounding the vehicle was a likely cause of the emergency action, the object being a notification target, causing, by the control circuitry in combination with transmitter circuitry in the vehicle, a notification to be transmitted to at least one of a communication device of the notification target or a server indicating that the notification target was the likely cause of the emergency action.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

There has been interest in alerting pedestrians to a potential danger before the pedestrian finds themselves in a dangerous position. For example, US 2018003306 A1 introduced a driver assistance apparatus which transmits an alarm signal to a terminal of a pedestrian to alert the pedestrian of an incoming danger.

However, there is currently no means of notifying a pedestrian, cyclist or driver that they were involved in a near-miss event. Specifically, there is no means of notifying a pedestrian that a vehicle performed an emergency action (automated or manual) in view of the pedestrian's actions. Determining a cause of the emergency action and establishing a communication channel with the pedestrian, cyclist or driver responsible for causing the emergency action represents a technical challenge. In order for the notification to be effective, in some embodiments it is desirable that the communication link is of high availability and low latency.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
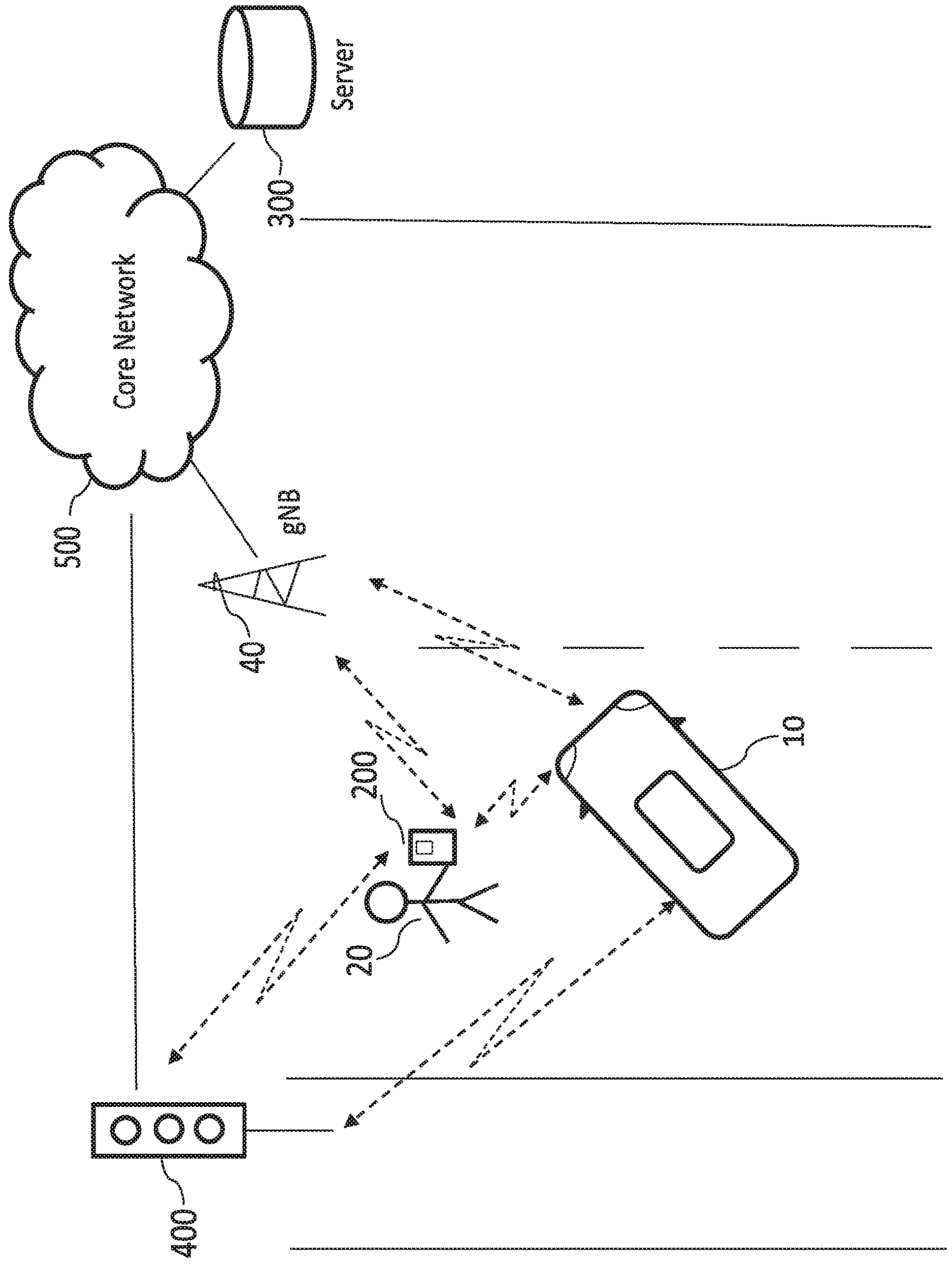
FIG. 1 illustrates an overview of a wireless communications system in accordance with exemplary embodiments.

FIG. 1 provides an example of a wireless communications network for transmitting a notification to a pedestrian that they were a likely cause of an emergency action taken by a car in accordance with example embodiments. FIG. 1 illustrates a smartphone of a pedestrian 20 which is configured to communicate with a car 10, a traffic light 400 and/or a gNB 40. The car 10 is configured to communicate with the smartphone 200, traffic light 400 and/or gNB 40. The gNB 10 and the traffic light 400 are configured to communicate with a core network 500 which itself may communicate with a remote server 300.

It will be appreciated that the smartphone 200 is an example of a communications device and any communications device configured to communicate with the car 10, traffic light 400 and/or gNB 40 may be used. For example, the communications device may be a smart watch, tablet or the like. In further examples the communications device may be embedded in or otherwise attached to clothing, accessories or jewelry.

It will be appreciated that the pedestrian is an example of a potential notification target and any person with a communications device configured to communicate with the car 10, traffic light 400 and/or gNB 40 may be used. A potential notification target is an object in a region surrounding the car which is capable of receiving a notification indicating that the notification target was a likely cause of the emergency action. Other examples of potential notification targets are cyclists with smartwatches, other drivers of cars with communications systems or the like. A notification target is a potential notification target who has been determined as a likely cause of an emergency action being performed.

It will be appreciated that the traffic light 400 is an example of street furniture and any street furniture configured to communicate with the smartphone 200, car 10 and/or core network 500 may be used. For example, the street furniture may be a lamppost, public bench, bollard or the like.

It will be appreciated that a car is an example of a vehicle and any vehicle configured to communicate with the smartphone 200, traffic light 400 and/or gNB 40 may be used. For example, the vehicle may be a motorcycle, aircraft, bus, train or the like. The vehicle may be driven by a human being or the vehicle may be an autonomous or self-driving vehicle.

It will be appreciated that the gNB 40 is a radio access point to the core network 500 and any radio access point to the core network 500 which is configured to communicate with the car 10, smartphone 200 may be used. For example, the radio access point to the core network 500 may be an eNB, Distributed Unit (DU), transmission and reception point (TRP), Central Unit (CU) or the like.

In accordance with example embodiments, there may arise a situation in which the car 10 takes an emergency action in view of actions of the pedestrian 20. In other words, the emergency action 10 taken by the car 10 may result in a near-miss event between the car 10 and the pedestrian 20. FIG. 1 illustrates the car 10 swerving to avoid the pedestrian 20. In such a situation, the wireless communication network shown in FIG. 1 enables the car 10 to arrange for the smartphone 200 of the pedestrian 20 to receive a notification informing the pedestrian 20 that they were a likely cause of the emergency action. The pedestrian may therefore take extra precautions to avoid a similar near miss event in the future.

As will be explained in more detail below, the notification may be transmitted from the car 10 directly or indirectly to the smartphone 200. Direct communication may be attained by using a short-range wireless communication technology (such as Bluetooth). Indirect communication may be attained by transmitting the notification to the smartphone 200 via the traffic light 400 (using Wi-Fi for example) or via the gNB 40 connected to the core network 500.

The server 300 may be used to provide a service to the smartphone and vehicle. The service may be subscription-based. The pedestrian 20 may access the service via an application on the smartphone 200 for example. The service may require the pedestrian 20 to submit an image or other parameters such as but not limited to size, gender, age, gait analysis parameters of the pedestrian 20 to be used for identification of the pedestrian 20. The service may also require the pedestrian 20 to continuously or periodically transmit his/her location to the server using the smartphone 200. The server may use this information to determine an identity of the pedestrian 20 in accordance with exemplary embodiments as will be explained below.

Figure 2:
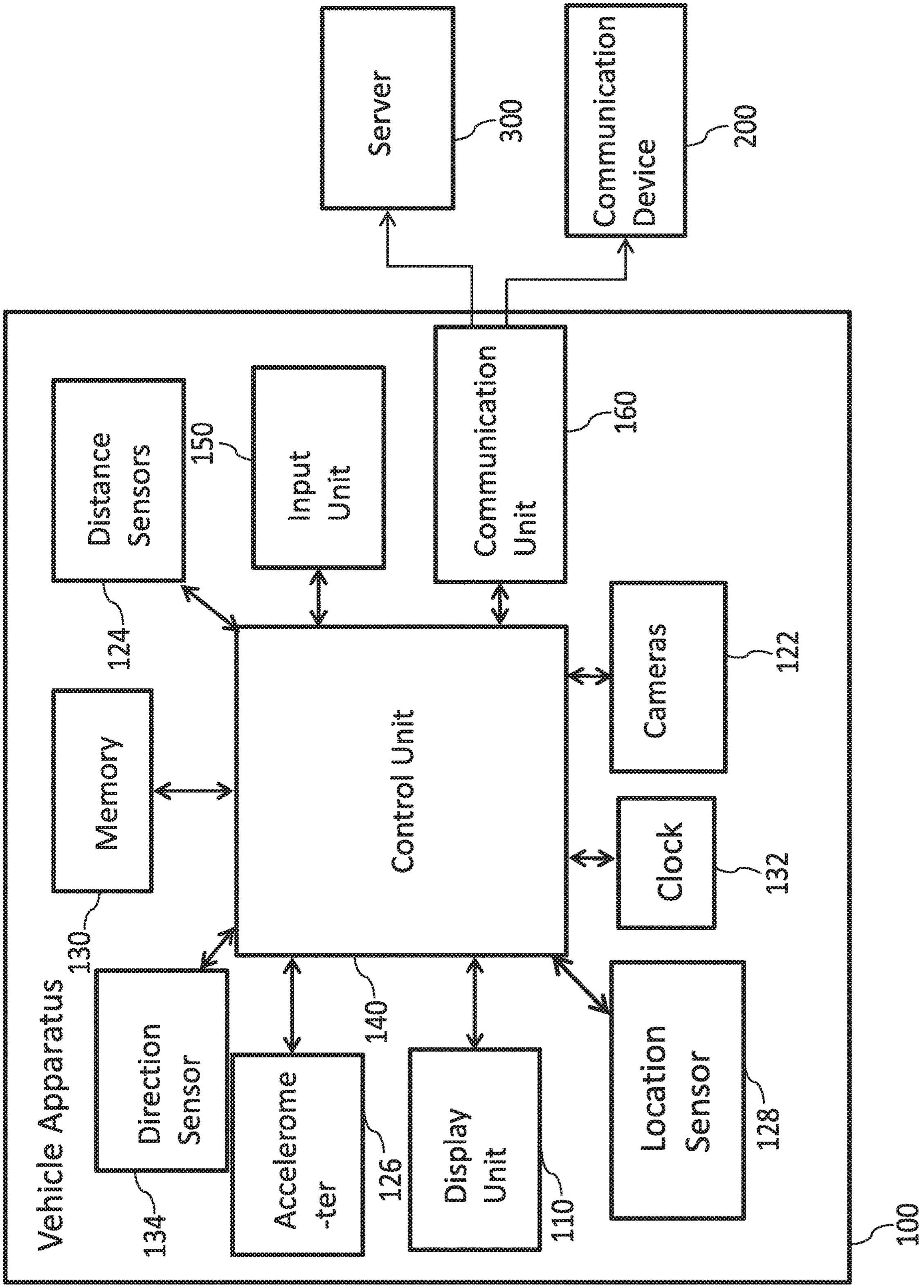
FIG. 2 is a block diagram illustrating a vehicle apparatus in accordance with exemplary embodiments.

Example embodiments can provide a safety improvement system, which can be used in one application to improve pedestrian safety. As shown in FIG. 2, a vehicle apparatus 100 may be implemented in the car 10. The vehicle apparatus 100 is configured to communicate a notification to the smartphone 200 informing the pedestrian 20 that a near miss event has occurred.

Determining Emergency Action Event

The vehicle apparatus 100 is configured to determine if a near-miss event has occurred in view of actions of a third party. A third party may be a pedestrian, a cyclist, other drivers or the like. A near-miss event is an event in which the car 10 performs an emergency action to avoid a collision in view of actions of the third party. An emergency action may be one or more of emergency braking, a sudden change in direction of the vehicle or the like. Emergency actions may be performed autonomously by autonomous or self-driving vehicles. For example, the vehicle may perform an emergency action such as emergency braking if an unaware pedestrian or cyclist strays in front of the vehicle. The emergency action may be any action which attempts to avoid a collision with the pedestrian. The emergency action may be automated (for example Automated Emergency Braking (AEB)) or the emergency action may be performed manually by a driver of the vehicle (for example, the driver performs an emergency stop by pressing the brakes). In other embodiments, the driver may turn the steering wheel sharply, thereby altering the direction of the vehicle, to avoid the pedestrian. After determining that a near-miss event has occurred, then example embodiments of the present disclosure serve to notify a notification target that the near-miss event has occurred. In this example, the notification target may be the pedestrian 20 whose actions lead to the emergency action. In some embodiments it is desirable that the notification target is notified of the near-miss event as soon as possible after the near-miss event has occurred so that the notification target may take precautions to avoid near-miss events in the future.

FIG. 2 shows a vehicle apparatus 100 according to example embodiments. According to FIG. 2, the vehicle apparatus 100 comprises a control unit 140 which is configured to receive information from and/or provide information to a communication unit 160, an input unit 150, a display unit 110, a, a memory 130, distance sensors 124, cameras 122, a clock 132, a direction sensor 134, an accelerometer 126 and location sensors 128. It will be appreciated that FIG. 2 is an exemplary embodiment and not all of the units shown are required to achieve the effects of the present disclosure as will be explained below. The vehicle apparatus 100 may be a single unit as shown in FIG. 2. In some embodiments, each of the units within the vehicle apparatus 100 may be distributed throughout the car 10. In general, the vehicle apparatus 100 is used herein to refer to the one or more of the units in FIG. 2.

In some embodiments, the vehicle apparatus may comprise one or more cameras 122. The one or more cameras 122 may be configured to capture one or more images or moving images of the region surrounding the vehicle as image information. In some embodiments, a plurality of cameras 122 may be mounted on the vehicle to cover a 360 or near-360 degree perspective of the surrounding region. The one or more cameras 122 may provide the image information to the control unit 140.

In some embodiments, the vehicle apparatus 100 may comprise one or more distance sensors 124. The distance sensors 124 may be Light Detection and Ranging (LIDAR) sensors for example. The one or more distance sensors are configured to detect a distance of objects in the surrounding region from the one or more distance sensors on the vehicle as distance information. Examples of objects in the surrounding region are pedestrians, street furniture, cyclists other vehicles or the like. The distance sensors 124 sensors provide the distance information to the control unit 140.

In some embodiments, the vehicle apparatus 100 may comprise 100 a location sensor 128. The location sensor may be a Global Positioning System (GPS) or Global Navigation Satellite System (GNSS) for example. However, it will be appreciated that any location sensor configured to determine a location of the car 10 over time may be used. The location sensors provide a location of the car as location information to the control unit 140.

In some embodiments, the vehicle apparatus 100 may comprise a clock 132. The clock, may be used to record a passage of time as time information and provide the time information to the control unit 140. The time information may be associated with other information provided to the control unit 140. For example, the time information 132 may be used to identify a time at which an image taken by one or more of the cameras 122 was taken.

In some embodiments, the vehicle apparatus 100 comprises an accelerometer 126. The accelerometer 126 may monitor an acceleration of the car 10 and provide the acceleration of the car over time to the control unit 140 as acceleration information. If the control unit 140 determines that a sudden change in acceleration has occurred on a basis of the acceleration information provided by the accelerometer 126, then this may be an indication that an emergency action has been performed by the car 10.

In some embodiments, the vehicle apparatus 100 comprises a direction sensor 134. The direction sensor may monitor a direction of the car 10 and provide the direction of the car 10 to the control unit 140 as direction information. If the control unit 140 determines that a sudden change in direction has occurred on a basis of the direction information provided by the direction sensor 134, then this may be an indication that an emergency action has been performed by the car 10.

The distance sensors 124, cameras 122, clock 132, location sensor 128, direction sensor 134 and accelerometer 126 provide distance information, image information, location information, direction information and/or acceleration information respectively to the control unit 140. This information may be used by the control unit 140 to determine whether an emergency action and/or a near miss event has occurred as will be explained below.

The control unit 140 is configured to receive information from and provide information to one or more of the units in FIG. 2. The control unit 140 may determine, on a basis of the information provided by one or more of the units, whether an emergency action has occurred. The control unit 140 may further determine that a near-miss event has occurred in view of actions taken by the pedestrian 20 as will be explained below.

For example, the accelerometer 126 may provide the control unit 140 with the acceleration of the vehicle over a period of time. If the control unit 140 determines that a rate of decrease in speed is above a pre-defined threshold, then it may determine that an emergency action has been performed. The pre-define threshold may be adaptive to any one or more of weather conditions, road surface conditions, vehicle condition (such as tyre or brake conditions) which may be input via sensors. The direction sensor 134 may provide the control unit 140 with the direction of the vehicle over a period of time. If the control unit 140 determines that a rate of change in the direction of the vehicle is above a pre-defined threshold, then it may determine that an emergency action has occurred. In response to determining that an emergency action has occurred, the control unit 140 may determine whether a near-miss event has occurred in view of actions taken by the pedestrian 20. The control unit 140 may determine that a near-miss event has occurred on a basis of the information provided by the one or more units as explained below.

Identifying the Cause of the Emergency Action

In some embodiments, the control unit 140 may use image information of the region surrounding the vehicle provided by one or more cameras 122 and distance information provided by the distance sensors 124 to determine a likely cause of the emergency action. For example, the control unit 140 may use object recognition software to determine an identity of objects in a region surrounding the vehicle which may be pedestrians, cyclists, animals, street furniture or the like. The control unit 140 may specifically use image information captured at a same time at which the emergency action occurred to determine the identity objects in the region surrounding the vehicle at the time at which the emergency action occurred. The control unit 140 may use the distance information provided by one or more distance sensors to determine a distance between the vehicle and the identified objects in the surrounding region of the vehicle. For example, the control unit 140 may specifically use distance information captured at a same time at which the emergency action occurred. The control unit 140 may determine that the closest object at the time at which the emergency action occurred was a likely cause of the emergency action. However, the likely cause of the emergency action may not be contactable.

In some embodiments, image information is captured from one or more cameras 122 in a vehicle and a direction or field of vision of objects in a region surrounding the vehicle with respect to the orientation of the vehicle are determined from the images by a control unit of the vehicle 140. Receiver (or transceiver) circuitry of the vehicle (for example, in a communication unit 160) may receive signals from transceiver circuitry from one or more of the objects and determine which object is the most likely to have caused an emergency action by comparing the direction of the field of vision determined from the image information with an estimated direction from which the signals are received. The estimated direction from which signals are received may be estimated by a signal strength of the received signals, or by determining an angle of arrival at an array of antennae in the vehicle (which may be in the communication unit 160 for example).

Figure 3:
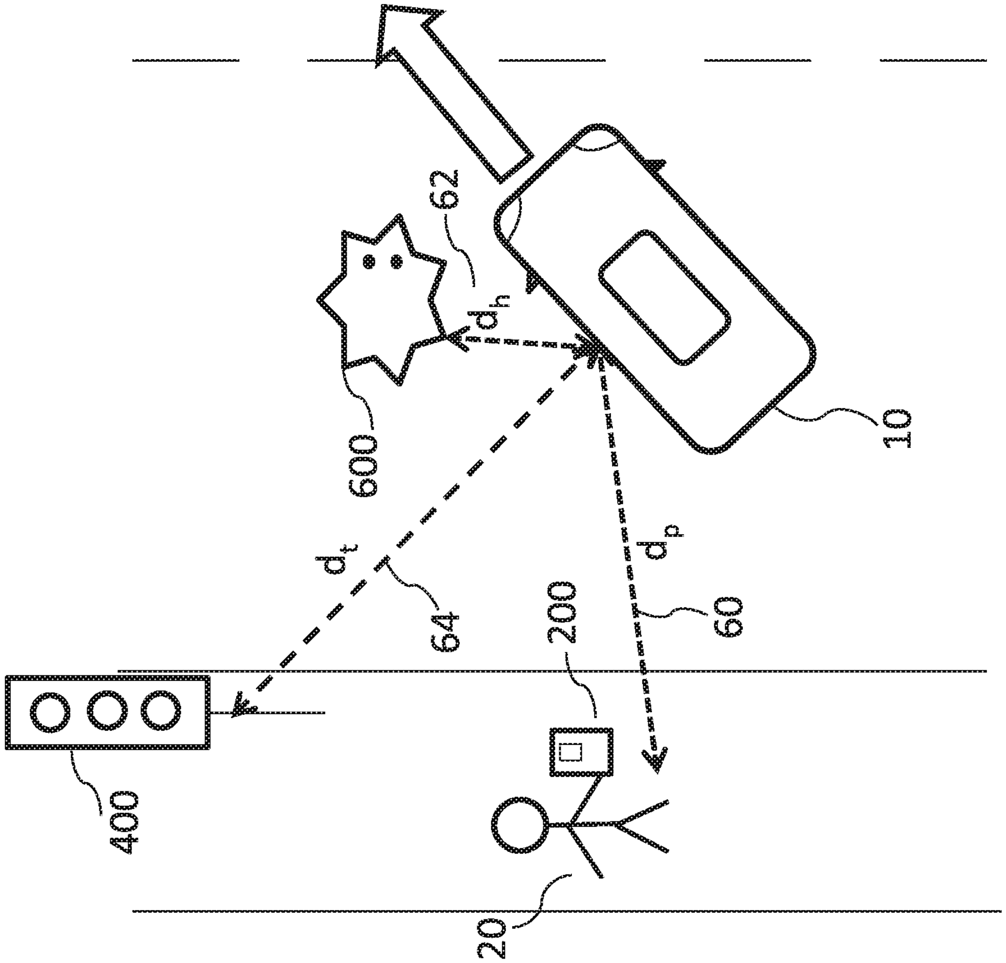
FIG. 3 illustrates an example of an emergency action being performed by a vehicle in view of actions of a hedgehog.
Figure 4:
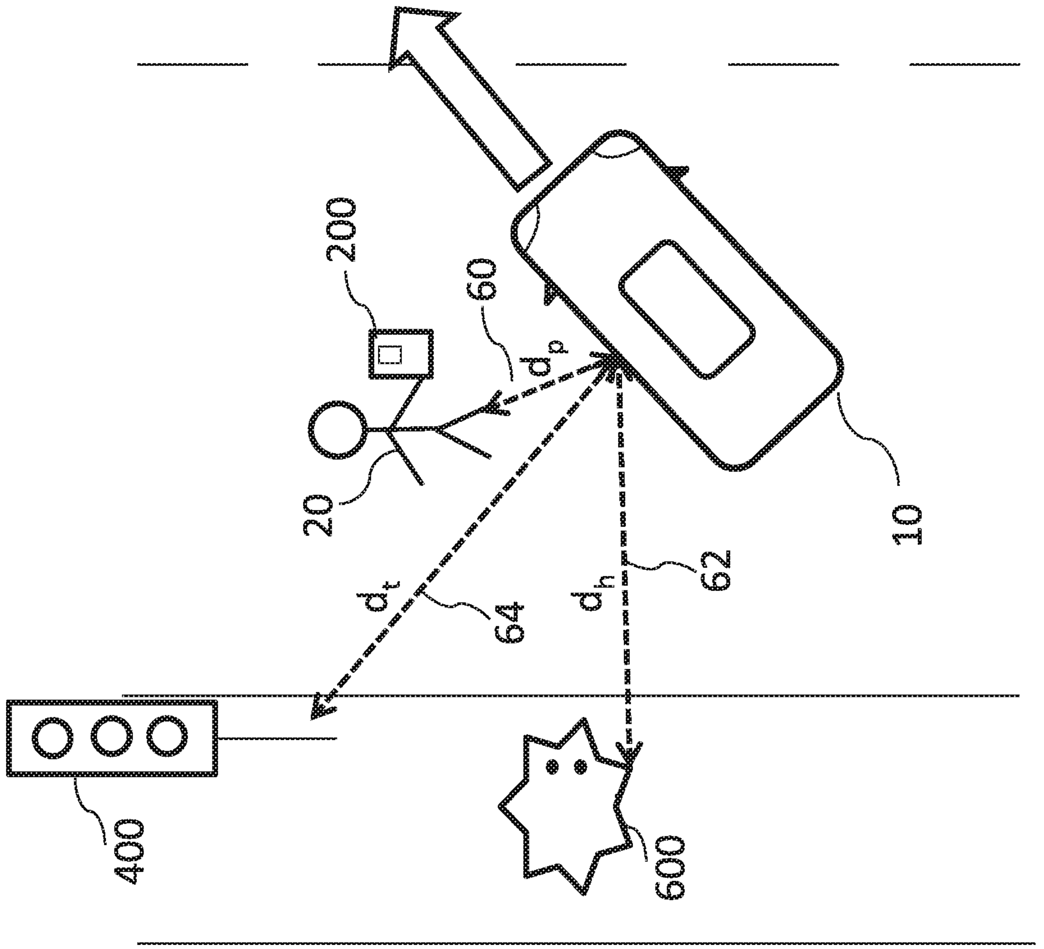
FIG. 4 illustrates an example of an emergency action being performed by a vehicle in view of actions of a pedestrian.

For example, an image of the surrounding region may include a pedestrian, a hedgehog and a traffic light. An example of such a situation is shown in FIGS. 3 and 4. As will be appreciated from FIGS. 3 and 4, a pedestrian 20, a hedgehog 600 and a traffic light 400 are present in a region surrounding a car 10. The pedestrian 20, hedgehog 600 and traffic light 400 are examples of "objects in a region surrounding a vehicle". FIGS. 3 and 4 are also show approximate distances between a distance sensor on the car 10 and the pedestrian 20 ("$d_p$" 60), the hedgehog ("$d_h$" 62) and the traffic light ("$d_t$" 64). In FIG. 3, the hedgehog strays in front of the car 10 and the car performs an emergency action in order to avoid a collision with the hedgehog 600. In FIG. 4, the pedestrian 20 strays in front of the car 10 and the car performs an emergency action in order to avoid a collision with the pedestrian 2. In both examples, the emergency action is an abrupt change in direction of the car 10.

Figure 5:
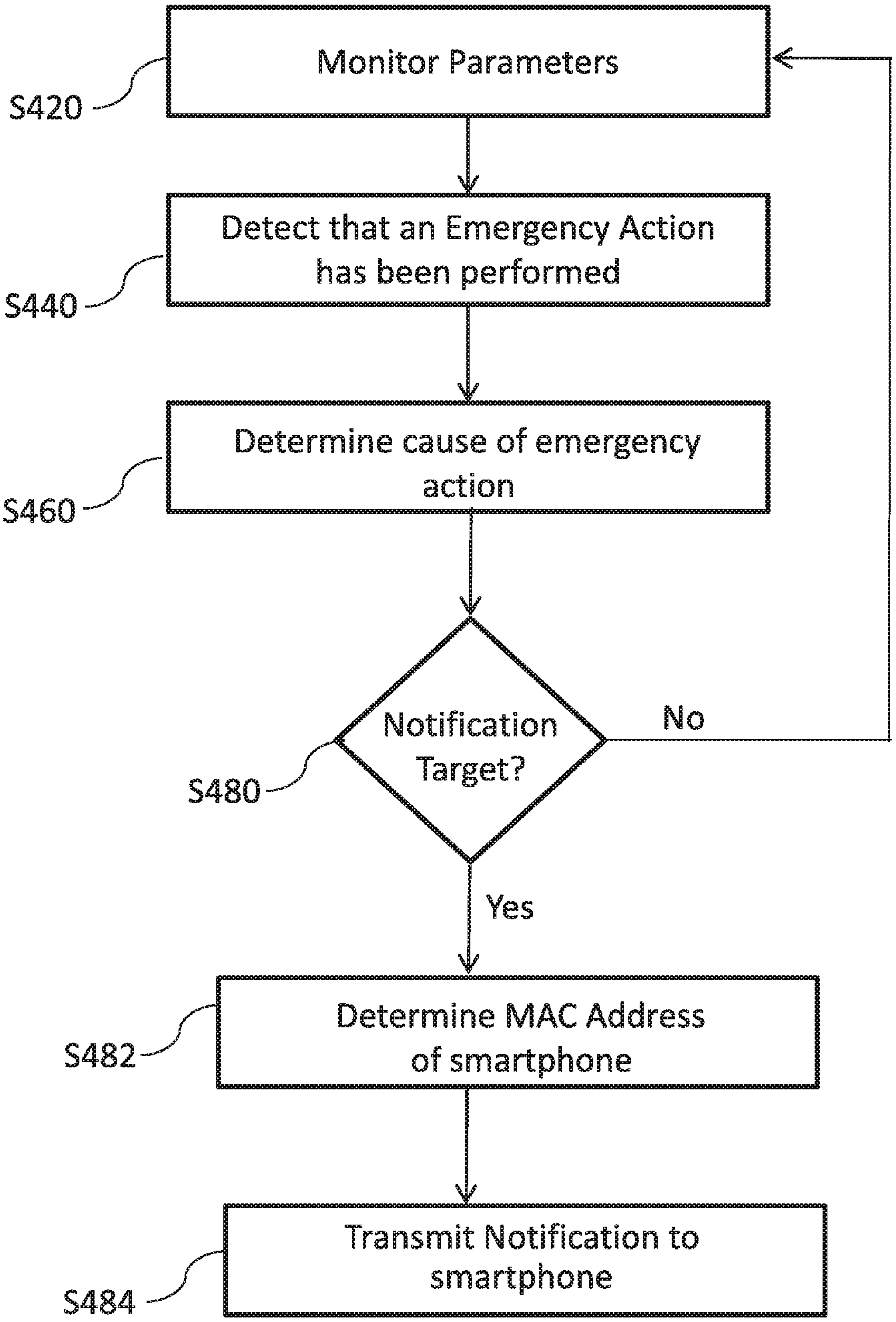
FIG. 5 is a flow diagram illustrating a processing procedure carried out by the vehicle apparatus according to exemplary embodiments.

An explanation of the processing procedure followed by the vehicle apparatus in the situation of FIGS. 3 and 4 is shown in FIG. 5. During step S420, the vehicle apparatus 100 monitors one or more parameters. In other words, the control unit 140 may monitor acceleration information, distance information, and/or direction information of the car 10 provided to the control unit 140. In step S440, the control unit 140 determines that an emergency action has been performed. It is clear from FIGS. 3 and 4 that the car 10 swerves to avoid a collision with the hedgehog 600 and the pedestrian 20 respectively. Therefore the control unit 140 may determine that the direction information provided by the direction sensor 134 indicates an abrupt change in direction. In other words, the rate of change in direction over a period of time is above a pre-defined threshold. Therefore the control unit 140 determines that an emergency action has been performed by the car 10. In step S460, the control unit determines a likely cause of the emergency action. The control unit may determine the likely cause of the emergency action on a basis of distance information and image information provided to the control unit. In this example, the image information may comprise images of the scenarios in FIGS. 3 and 4 respectively taken by the one or more cameras 122. The distances information may comprise the distances $d_p$ 60, $d_h$ 62 and $d_t$ 64. The control unit 140 may perform image processing on the received image information. For example, the control unit 140 may use object recognition software to recognise the pedestrian 20, hedgehog 600 and the traffic light 400. The control unit 140 may determine that the likely cause of the emergency action was the closest object in the region surrounding the car 10 when the emergency action was performed. Therefore, in FIG. 3, since $d_h$ 62 is less than $d_p$ 60 and $d_h$ 62 is less than $d_t$ 64, then the control unit 140 may determine that the hedgehog 600 was a likely cause of the emergency action. In FIG. 4, since $d_p$ 60 is less than $d_h$ 62 and $d_p$ 60 is less than $d_t$ 64, then the control unit 140 may determine that the pedestrian 20 was a likely cause of the emergency action. In some embodiments, a server may determine the likely cause of the emergency action as will be explained below.

In step S460, the control unit 140 may determine if the likely cause of the emergency action is a potential notification target. A notification target may be a determined cause of an emergency action who is contactable by any wireless communication method known in the art. For example, for the scenario in FIG. 3, the likely cause of the emergency action is the hedgehog 600. Clearly, a hedgehog cannot be contacted and so the control unit 140 determines that the cause of the emergency action is not a notification target. In this case, processing returns to step S420 and the vehicle apparatus 100 resumes monitoring the one or more parameters. However, for the scenario shown in FIG. 4, the pedestrian 20 is the likely cause of the emergency action. Because the pedestrian 20 is a human subject and is therefore likely to be contactable by a wireless communication method, the control unit 140 may determine that the pedestrian 20 is a notification target. In this case, processing proceeds to step S482 in which a MAC address of the smartphone 200 is determined. In step S484, the notification is transmitted to the smartphone using the determined MAC address. Steps S482 and S484 will be explained in more detail below.

In some embodiments, the control unit may use gait analysis on the image information captured at the time at which the emergency action occurred to determine the notification target in step S480. For example, the control unit may determine that the pedestrian 20 was a likely cause of the emergency action on a basis of a speed, height, stride length, pattern of motion (such as arm swing), direction of motion or the like of the pedestrian 20 determined from the gait analysis.

If it is determined that the pedestrian is the notification target as in step S480 FIG. 4 above, then example embodiments the present disclosure serve to increase both pedestrian and driver safety by notifying the pedestrian that they were involved in a near-miss event as soon as possible after the occurrence of the near-miss event. In this way, the pedestrian becomes aware that they were a likely cause of the near-miss event and may take steps to reduce a likelihood of another near-miss event in the future, thereby increasing both pedestrian and driver safety.

Communicating with the Notification Target

In example embodiments, the vehicle apparatus 100 (and in particular the communication unit 160) is configured to transmit a notification that the pedestrian 20 was a likely cause of the emergency action. The notification may be transmitted directly to a communication device of the pedestrian (for example, smartphone 200), or the notification may be transmitted indirectly to the smartphone 200 via street furniture (for example, traffic light 400), or a radio access point to the core network 500 (for example, gNB 40).

In some embodiments, the control unit 140 may receive updated image information, distance information and/or location information from the one or more cameras 122, the distance sensors 124 and the location sensor respectively after it has been determined that an emergency action has been occurred. The control unit 140 may use the updated image information, distance information and/or location information to determine a Media Access Control Layer (MAC) address of the smartphone 200 for communication of the notification as will be explained with reference to example embodiments below.

The updated image information may include an image of the region surrounding the car 10 at a time at a time after the emergency action has occurred. The updated distance information may include distances between objects in the region surrounding the car 10 at a time after the emergency action has occurred. The updated location information may include a location of the car 10 at a time at a time after the emergency action has occurred. It will be appreciated that the pedestrian 20 may have moved between the point at which the emergency action occurs (shown in FIG. 5) and the time after the emergency action has occurred.

For example, the updated image information may include an image of a region surrounding the car 10 and a distance the pedestrian 20 (which the control unit 140 determines to be the notification target) from the car 10 at a time after the emergency action occurred. In example embodiments, the control unit 140 may recognise the pedestrian 20 in the updated image information by comparing the updated image information with the image information captured at the time at which the emergency action occurred. For example, the control unit 140 may use object recognition software to recognise the pedestrian in the image captured at the after the emergency action has occurred by comparing it with the image captured at the time at which the emergency action occurred. The control unit 140 may then determine a distance of the pedestrian 20 from the car 10 at the time after the emergency action has occurred using the updated distance information provided to the control unit 140 by the distance sensors 124.

In example embodiments, a position of the pedestrian 20 at the time after the emergency action has occurred may be determined by comparing the updated distance information with the updated location information providing a location of the car 10 at the time after the emergency action occurred.

The control unit 140 may instruct the communication unit 160 to communicate with the pedestrian 20 determined to be the notification target. Specifically, the control unit 140 may instruct the communication unit 160 transmit a notification to a smartphone, informing the pedestrian 20 that they were involved in a near miss event. The notification may include information used to determine that the pedestrian 20 was a likely cause of the emergency action. For example, the notification may include one or more images of the region surrounding the vehicle captured by the one or more cameras 122 at a time at which the emergency action occurred.

In some embodiments, it is desirable that the notification is transmitted to the pedestrian 20 as soon as possible after the occurrence of the near-miss event. In other words, it is desirable that communication between the communication unit 160 and the smartphone 200 is established as soon as possible after the occurrence of the near-miss event. Therefore the communication link between the communication unit 160 and the notification target should be of low latency and high availability.

The communication unit 160 comprises at least a transmitter and a receiver. As shown in FIG. 2, the communication unit 160 is configured to communicate with the communication device of the notification target and/or the server 300. The communication may occur using V2X (Vehicle to everything) or V2P (vehicle to pedestrian) technology for example. In other examples, the communication may occur via a Low Power Wide Area Network (LPWAN).

Figure 6:
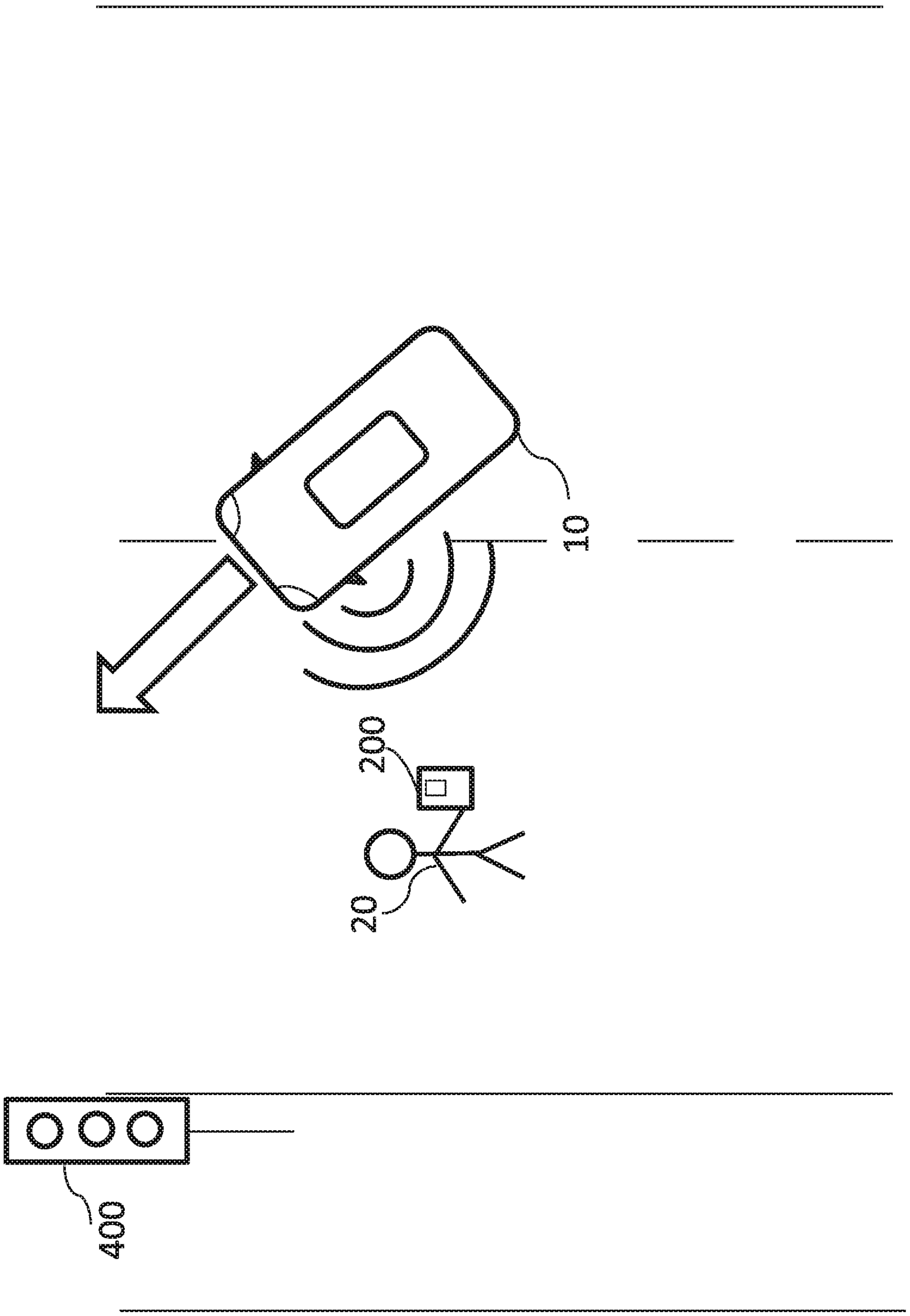
FIG. 6 illustrates direct communication between a pedestrian and a vehicle following a near-miss event according to exemplary embodiments.

FIG. 6 illustrates a car attempting to transmit a notification directly to a communication device of a pedestrian determined to be a likely cause of an emergency action using a short range wireless communication technology. Specifically, FIG. 6 represents the scenario of FIG. 5 at a time at which the car 10 has determined that the pedestrian 20 is the notification target. The hedgehog 600 is not shown in FIG. 6 for clarity.

In this example, the communication unit 160 may be configured to transmit the notification using short-range communication by using one or more wireless technology standards including Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies. In other words, the communication unit 160 is configured to communicate directly with the smartphone 200 in this example.

The notification will include at least a message alerting the pedestrian 20 that they were involved in a near miss event. For the communication unit and the smartphone 200 to communicate directly, there must exist pairing between the devices. Pairing may include a discovery process or any exchange of security information known in the art. The pairing may occur according to any wireless communication technology standards (for example, Bluetooth). The pairing may occur before and/or after the near-miss event has occurred.

In example embodiments, the smartphone 200 and communication unit 160 may pair automatically via Bluetooth technology. Bluetooth pairing is possible if the smartphone 200 and the communication unit 160 become close enough together. The pairing may occur automatically if the car 10 and the smartphone 200 become within a distance short enough to support communication by Bluetooth. Alternatively, when the smartphone 200 and the vehicle become within a distance short enough to support communication by Bluetooth, the communication device may receive a prompt requesting pairing and/or the vehicle apparatus may receive a prompt requesting pairing. If both the smartphone 200 and the car 10 have a vehicle safety mode activated then the pairing may occur automatically.

In some embodiments, there may be one or more communication devices within range of the wireless communication technology standard used to perform the communication. In this embodiment, the control unit may need to determine which of the communication devices is the smartphone 200 in order to transmit the notification. The vehicle apparatus may initiate pairing with the one or more devices within range of the wireless communication technology standard. In other words, the vehicle may connect to and pair with one or more Bluetooth devices including the communication device. The vehicle apparatus becomes aware of an address of each of the communication devices after pairing. For example, the vehicle apparatus becomes aware of the Medium Access Control (MAC) address of each communication device after pairing.

In example embodiments, each paired communications device may then its location to the vehicle apparatus based on a location determined by a GPS chip for example in the communications devices. The vehicle apparatus therefore has a MAC address and location of each communication device. By comparing the received location from the communication devices with the position of the pedestrian at the time after the emergency action occurred determined based on the updated distance information and updated location information as explained above, the vehicle apparatus can determine the MAC address of the smartphone 200. The notification is then transmitted to the smartphone 200.

Figure 7:
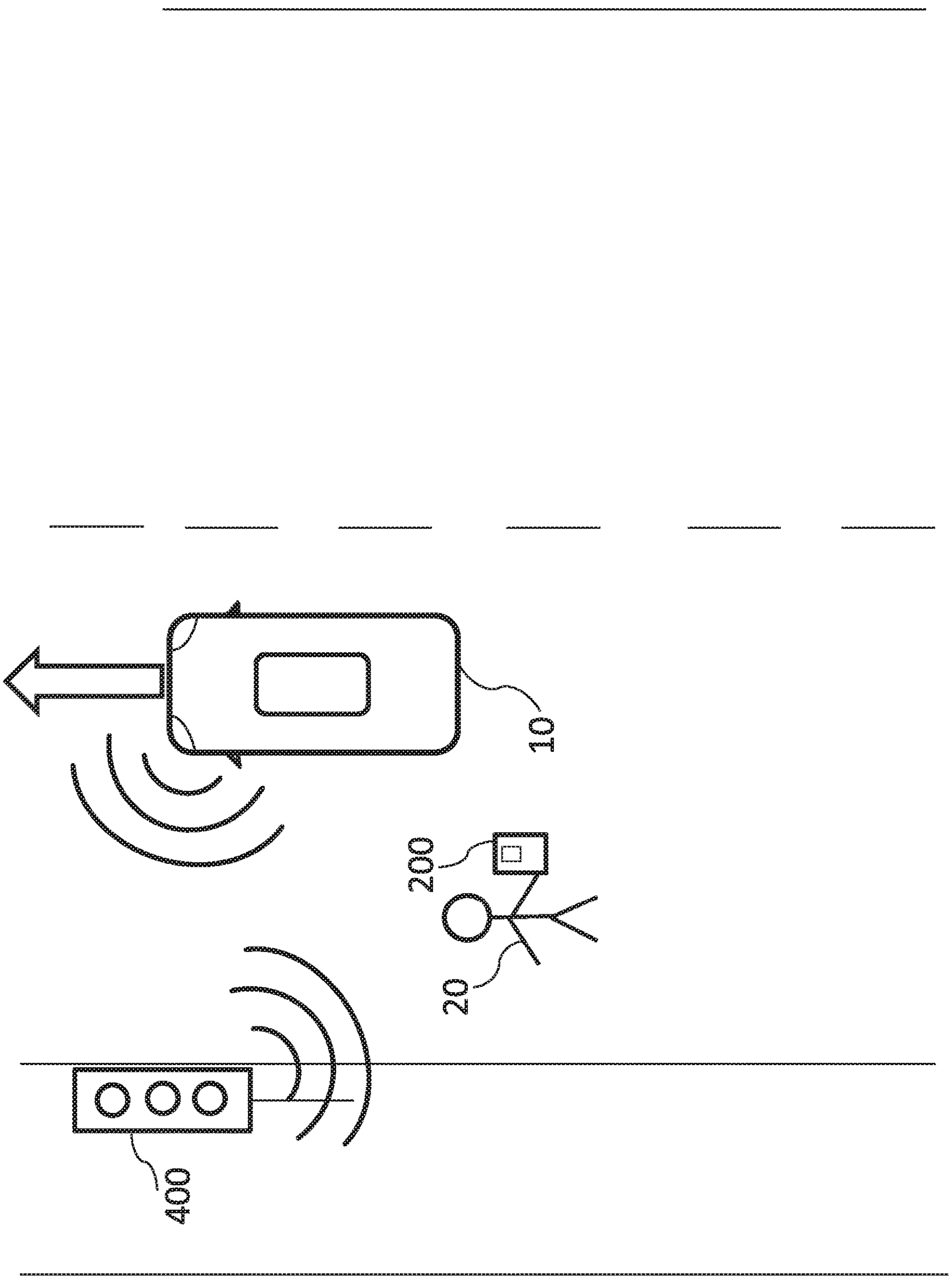
FIG. 7 illustrates indirect communication between a pedestrian and a vehicle via street furniture following a near-miss event in accordance with exemplary embodiments.

In an alternative embodiment, the communication unit 160 may transmit the notification to the smartphone 200 via street furniture using longer-range wireless technology standards including one or more of Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution Advanced (LTE-A). Such an example is shown in FIG. 7. Specifically, FIG. 7 represents the scenario of FIG. 5 at a time at which the car 10 has determined that the pedestrian 20 is the notification target. The hedgehog 600 is not shown in FIG. 7 for clarity.

For example, the smartphone 200 and the communication unit may communicate via Wi-Fi. In this example, a communication channel may be set up between the smartphone 200 and the communication unit 160 before the near-miss event has occurred or shortly after the near-miss event has occurred. A Wi-Fi router may be pre-installed in traffic light 400 to form a local network. The vehicle apparatus 100 and the smartphone 200 may form part of the local network by establishing a connection to the Wi-Fi router installed in the traffic light 400. The connection may be automatic or the driver of the vehicle and the user of the communication device may be prompted or opt to connect to the local network.

The traffic light 400 may have a stored MAC address and location of the one or more communication devices in the local network. In other words, the one or more communication devices may periodically or continuously transmits their location to the traffic light 400. The traffic light 400 may transmit the stored MAC address and location of the one or more communication devices in the local network to the communication unit 160 of the vehicle apparatus.

The communication unit 160 may compare a location of the pedestrian 20 determined from the updated distance information and location information with the location of the one or more communication devices in the local network received from the traffic light 400 to determine a MAC address of the smartphone 200. The communication unit 160 may then transmit the notification to the traffic light 400 to be relayed to the smartphone 200 using the determined MAC address. Preferably, the communication unit will transmit the notification to a street furniture which results in a minimum distance of transmission between the vehicle and the notification target to minimize the latency of the transmission.

Figure 8:
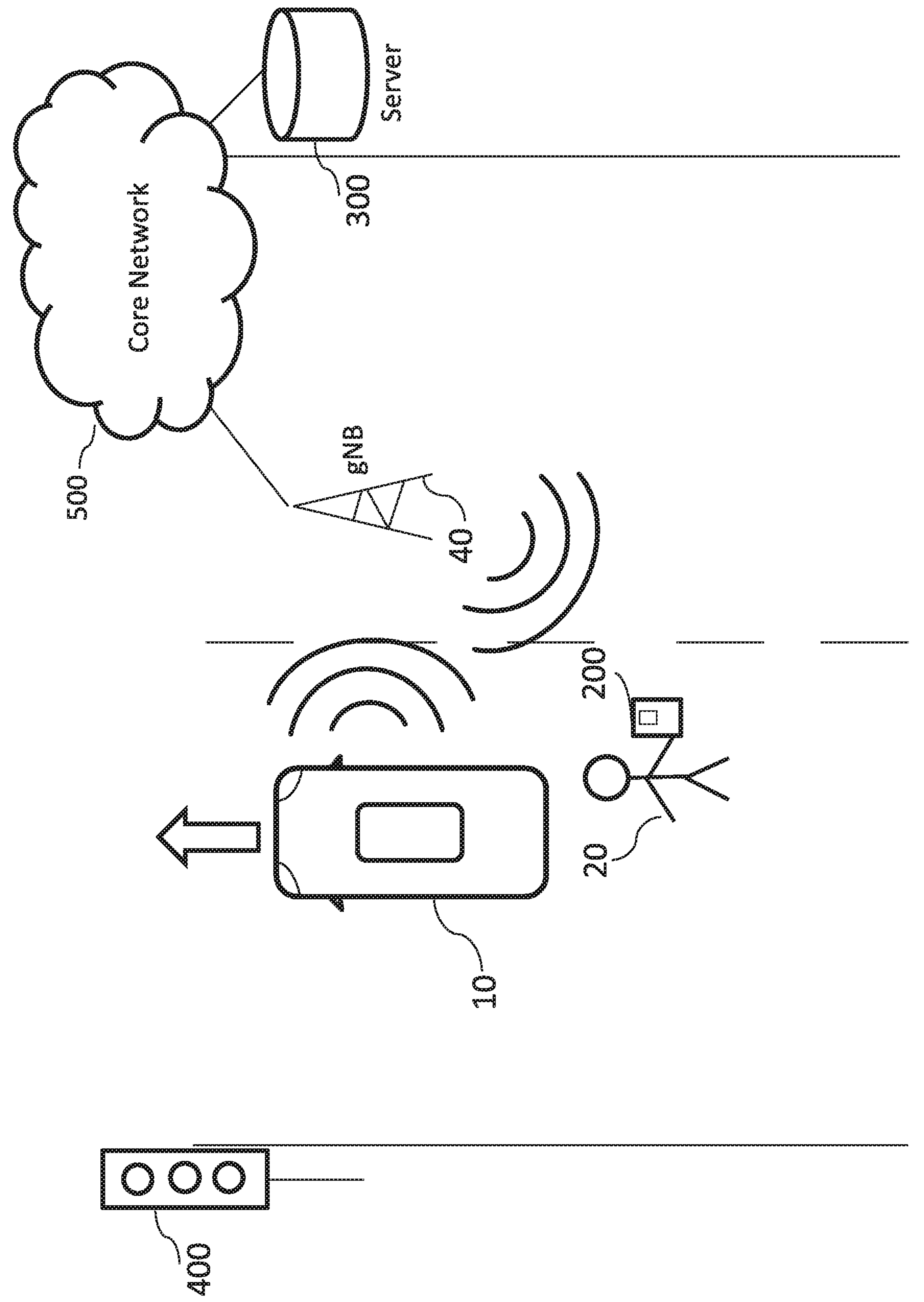
FIG. 8 illustrates indirect communication between a pedestrian and a vehicle via a base station following a near-miss event in accordance with exemplary embodiments.

In example embodiments, the communication device and vehicle apparatus may form part of a cellular network with a base station (or other infrastructure equipment allowing connection to a core network as will be appreciated by one skilled in the art). Such an example is shown in FIG. 8. Specifically, FIG. 8 represents the scenario of FIG. 5 at a time at which the car 10 has determined that the pedestrian 20 is the notification target. The hedgehog 600 is not shown in FIG. 8 for clarity. For example, the communication unit 160 of the vehicle apparatus may transmit the notification to the smartphone 200 using an Ultra-Reliable Low-Latency Communication (URLLC) service supported by the $5^{th}$ Generation (5G) New Radio (NR) Standard. In some examples, the notification may be transmitted using Non-Internet Protocol Networking (NIN) [1].

In FIG. 8, the communication unit 160 of the car 10 transmits the notification to a gNB 40 connected to a core network 500 which relays the notification to a smartphone 200 of a pedestrian 20 determined to be a likely cause of the emergency action.

After the control unit 140 has determined that the pedestrian was a likely cause of the emergency action, the communication unit 160 transmits the notification to the gNB 40. In example embodiments, the communication unit 160 may also transmit image information along with the notification. For example, the communication unit 160 may transmit one or more images taken by the cameras 122 at a time at which the emergency action occurred. In such embodiments, the core network 500 may forward the image information to a server 300. The server may compare the image information to a list of registered communication devices with associated current locations and MAC addresses. In other words, the server may provide a service for road safety. This may be a subscription based service for example. Users of the service may agree to provide an image of themselves along with a MAC address of their personal communication device and may agree for the communication device to periodically or continuously transmit its location to the server. Therefore the sever can use the image information sent by the communication unit 160 of the car 10 to determine an identity of the pedestrian 20 if the pedestrian has subscribed to the service. The server can then look up a MAC address of the smartphone 200 and transmit the notification sent by the car 10 to the smartphone 200. In some embodiments, the server may determine the likely cause of the emergency action based on one or more images received form the communication unit 160 at the time at which the emergency occurred.

Figure 9:
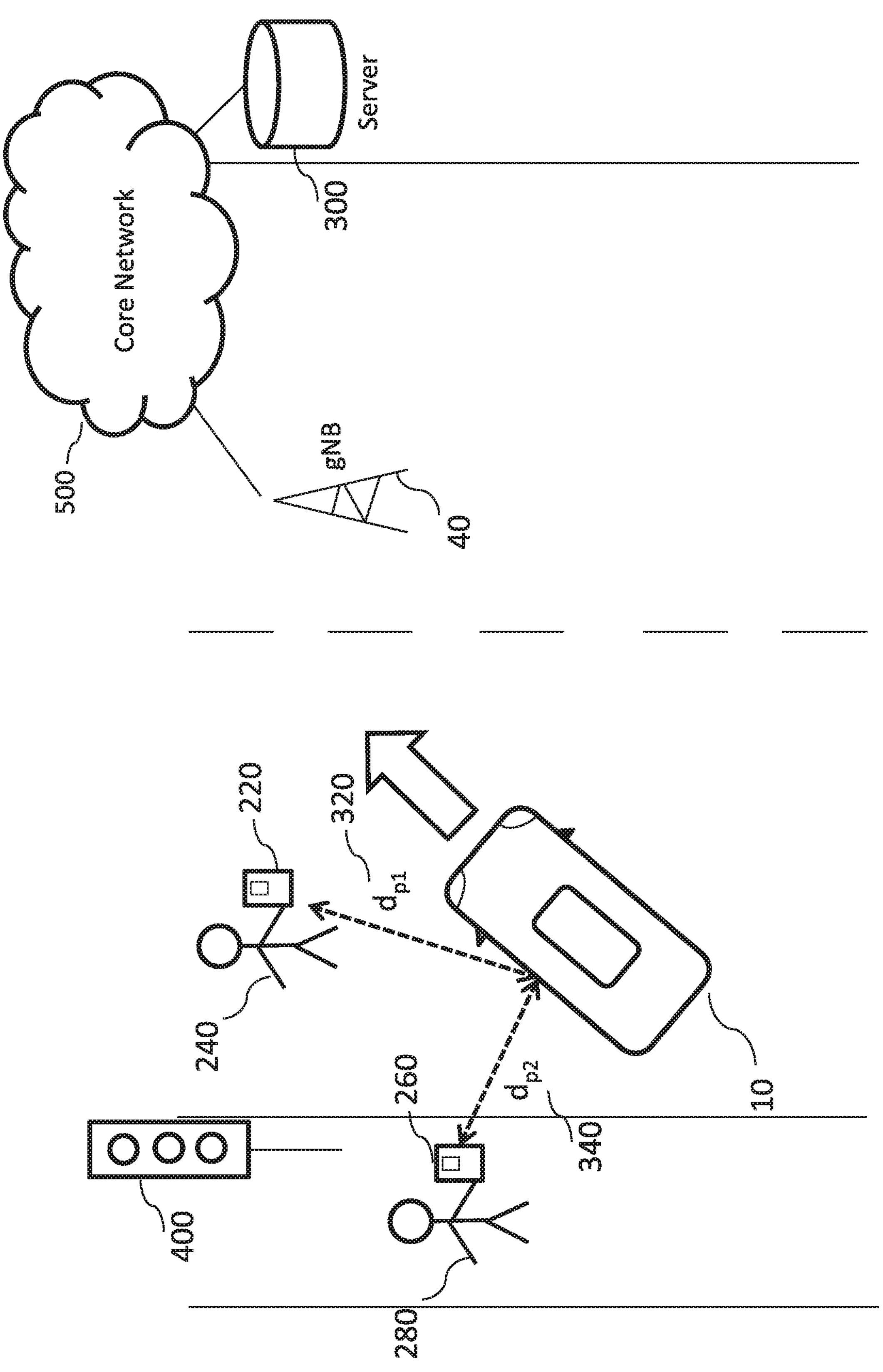
FIG. 9 illustrates two pedestrians in a region surrounding a vehicle at a time at which an emergency action occurs in accordance with exemplary embodiments.

In some embodiments, there may be more than one object in a region surrounding a vehicle and the vehicle apparatus may initially incorrectly identify one of the objects as a cause of the emergency action. For example, FIG. 9 illustrates an example scenario where there are two pedestrians in a region surrounding a car, but it is the pedestrian who is furthest away from the car who is the cause of the emergency action. FIG. 9 shows a first pedestrian 240 with a first smartphone 200 a distance $d_{p1}$ 310 away from a car 10, the first distance $d_{p1}$ 310 being greater than a second distance $d_{p1}$ 340 of a second pedestrian 280 with a second smartphone 260 away from the car 10. As will be appreciated from FIG. 9, the first pedestrian 240 is the cause of the emergency action.

Figure 10:
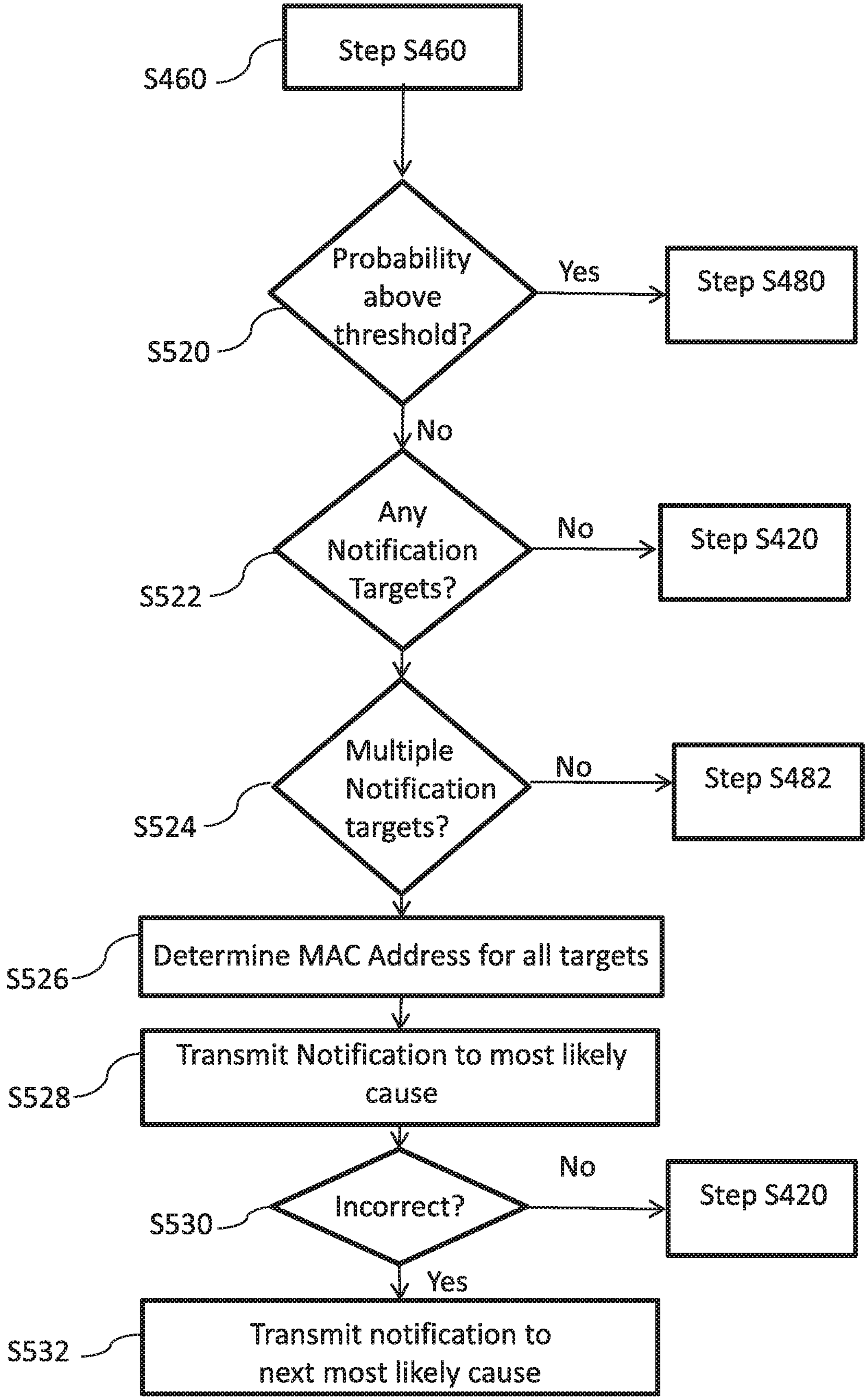
FIG. 10 is a flow diagram illustrating an example of a processing procedure carried out by the vehicle apparatus according to exemplary embodiments.

A processing procedure performed by the control unit 140 in such a situation as in FIG. 9 will be explained with respect to FIGS. 5 and 10. Steps S420, S440 and S460 will be performed by the control unit 140 as explained above in order to determine a likely cause of the emergency action. However, in some embodiments, the control unit 140 may determine, in addition to determining the likely cause of the emergency action in step S460, a probability of how likely the determined cause of the emergency action is likely to be correct. In such embodiments, processing proceeds from step S460 to step S520 as shown in FIG. 10 rather than from Step S460 to step S480 as shown in FIG. 5.

In step S460, the control unit 140 may determine that the second pedestrian 280 is a most likely cause of the emergency action because the second pedestrian 260 is closer to the car at a time at which the emergency action occurred (in other words, dp1 is greater than dp2). Therefore the control unit 140 will have incorrectly identified the cause of the emergency action.

In step S520, the control unit 140 may evaluate a probability of how likely the determined cause of the emergency action is likely to be correct. For example, the control unit 140 may determine whether $d_{p1}$ and $d_{p2}$ are both below a pre-defined distance threshold. If both distances are below the pre-defined threshold, the control unit 140 may determine that the probability that the second pedestrian has been correctly identified as the cause of the emergency action is below a probability threshold and vice versa. If the probability is above the threshold then processing proceeds to step S480 as explained above. If the probability is below the threshold then processing proceeds to step S522.

In step S522, the control unit 140 determines if there are any potential notification targets in a region surrounding the car 10. If there are no potential notification targets (in which case, the cause of the emergency action may have been a hedgehog, road obstacle or the like), the processing proceeds to step S420. If at least one potential notification target is detected, then processing proceeds to step S524. In step S534, the control unit 140 determines whether or not there is more than one potential notification target in the region surrounding the car 10. If it is detected that there is only one notification target in the region surrounding the car 10 then processing proceeds to step S482. If it is detected that there is more than one notification target in the region surrounding the car 10 then processing proceeds to step S526. For the example in FIG. 9, since there are two pedestrians in the region surrounding the car 10, and pedestrians are potential notification targets, then processing proceeds to step S526.

As will be appreciated, the control unit may determine whether or not objects in the region surrounding the vehicle are potential notification targets or not by performing object recognition and/or gait analysis on images provided to the control unit of the region surrounding the vehicle at the time at which the emergency action occurred.

In step S526, the communication unit 160 may transmit images of both the first and second pedestrian to a server 300 via a gNB 40 for determination of a MAC address of both the first and second smartphone because. The images of both the first and second pedestrian may be stored at the server for a pre-determined time period. In some embodiments, the determination of the MAC addresses is carried out by the control unit.

In step S528, the second pedestrian 280 may receive a notification via the second smartphone 260 that he was a likely cause of the emergency action from a server 300. In such embodiments, there may be provided an application on the smartphones 220, 260 the server 300.

In step S530, the second pedestrian 280 may use a user interface (UI) on the second smartphone 260 to indicate that that he was not a cause of the emergency action.

In step S532, in response to receiving the indication, the server 300 transmits the notification to the second most likely cause of the emergency action (in this case, the first pedestrian 240). In other words, the server 300 transmits a notification to the first pedestrian 240 via the first smartphone 220 that the first pedestrian 240 was a likely cause of the emergency action.

In such embodiments, the communication unit 160 of the car 10 may transmit images of the first and second pedestrians to the server along with the first and second distances at the time at which the emergency action occurred. The server 300 may evaluate the images of the first and second pedestrians provided by the communication unit 160 of the vehicle apparatus as well as the first and second distances. The server may use artificial intelligence (AI) or machine learning for example to improve an identification of the notification for future cases. For example, the server 300 may use the images of the first and second pedestrians to determine why the second pedestrian was incorrectly identified. For example, the server may determine that the second pedestrian 280 was incorrectly identified because, although the second pedestrian 280 was the closest object to the vehicle in a region surrounding the vehicle, he was on a footpath. The AI/machine learning may therefore reduce a probability that potential notification targets on footpaths are the likely cause of the emergency action in the future.

Each of the processing steps in FIG. 10 could be carried out by either the server 300 or the control unit 140 as will be appreciated by one skilled in the art.

Figure 11:
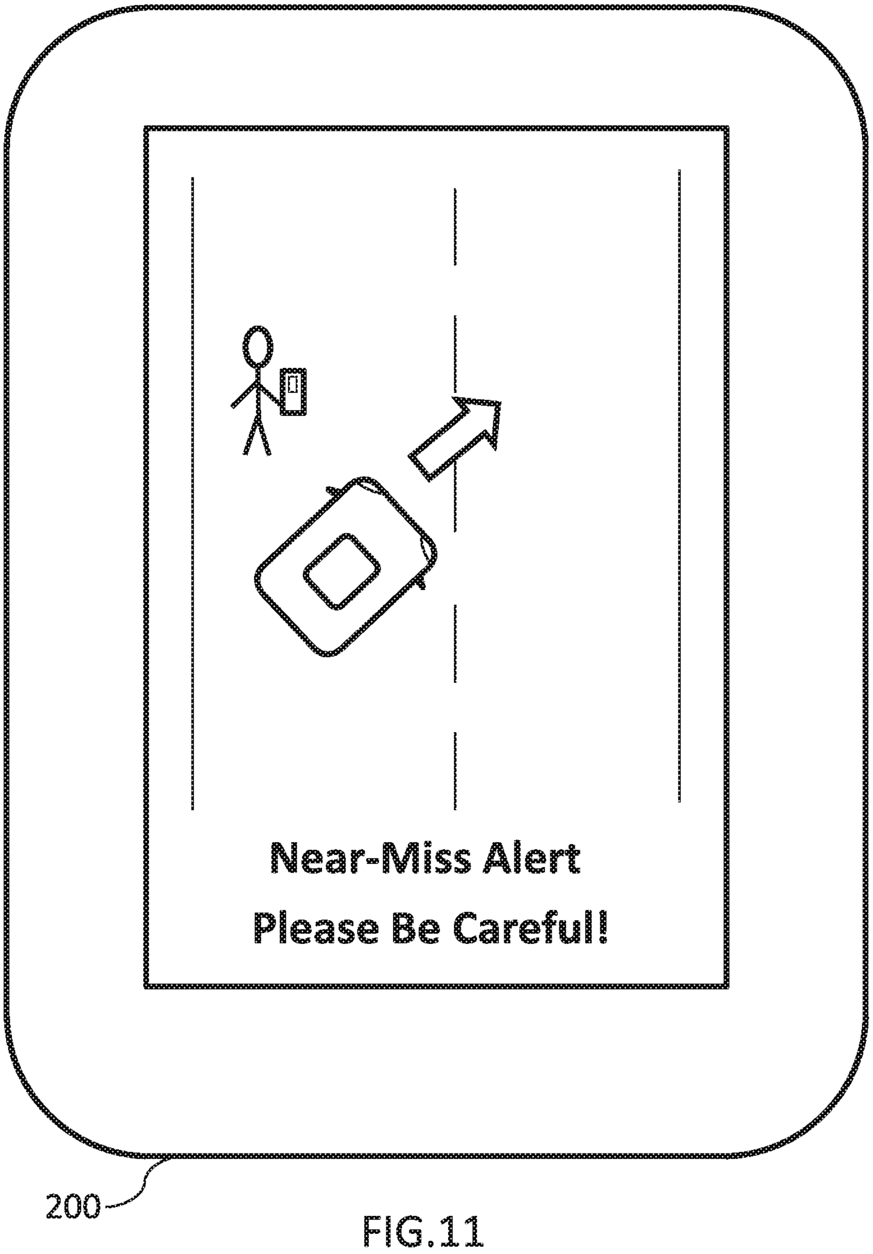
FIG. 11 illustrates an example of a notification received by a communication device of the notification target.

FIG. 11 illustrates an example of a notification received the smartphone 200. The notification includes an alert notifying the pedestrian 20 that they were involved in a near-miss event. In this example, the notification includes an instruction to the pedestrian to take more care in the future. The notification includes evidence that the pedestrian was the cause of the near-miss event. The evidence is an image of a region surrounding the vehicle at the time at which the emergency action occurred. It is clear from the image that the vehicle performed an emergency action in view of actions of the pedestrian.

In some embodiments, the transmission of the notification from the communication unit 160 to the smartphone 200 is achieved through beam forming once the MAC address of the smartphone is known.

In some embodiments, the control unit 140 may instruct the communication unit 160 to transmit the notification directly to the communication device 200 and, if this fails, then instruct the communication unit to transmit the notification to the communication device 200 indirectly via street furniture or via a radio access point to a core network.

In some embodiments, the server 300 may be accessible by one or more other communication devices 200. The one or more other communication devices 200 may belong to relatives or concerned individuals of the pedestrian 20. In this way, the concerned individuals may access the notification that the pedestrian 20 was involved in a near miss event and was a likely cause of the emergency action. The notification may include the image information used to determine the notification target as evidence that the notification target caused the emergency action. Therefore, if the pedestrian 20 is a vulnerable person (such as a child or an elderly person), the concerned individuals will be aware that the vulnerable person took potentially dangerous actions. The concerned individuals may take steps to prevent the occurrence of a near miss event cause by the vulnerable person in the future.

In some embodiments, the control unit 140 may instruct the communication unit 160 to communicate with one or more vehicles in a region surrounding the vehicle which was involved in the near-miss event. In other words, the vehicle involved in the near-miss event may transmit a warning to one or more vehicles in the region surrounding the vehicle. The warning may include an indication that a near-miss event has occurred. The warning may include one or more images of the region surrounding the vehicle at the time at which the emergency action occurred. Therefore drivers of the one or more vehicles may take care in the region where the near-miss event occurred. For example, because the vehicle may have had to swerve onto the other side of the road or brake suddenly to avoid a collision.

In some embodiments, the control unit 140 instructs the communication unit 160 to broadcast the notification to all devices paired to the communication unit or registered at the modem/router of the street furniture. In some embodiments, the control unit 140 instructs the communication unit 160 to broadcast the notification to a plurality of devices paired to the communication unit or registered at the modem/router of the street furniture that are within a pre-defined distance of the vehicle.

As shown in FIG. 2, the vehicle apparatus 100 may include a memory 130 or data storage means. Image information, acceleration information, location information, time information and/or distance information may be provided to the memory 130 for storage continuously or at regular intervals for storage. Alternatively, the memory 130 may only store sensor information around a time at which a near-miss event was determined to have occurred.

As shown in FIG. 2, the vehicle apparatus 100 may comprise a display unit 110 configured to display information provided by the other units. For example, the display unit 110 may display one or more images captured by the one or more cameras 122. The display unit 110 may be present within the vehicle and visible to a driver of the vehicle.

In some embodiments, an input unit 150 is included within the vehicle apparatus 100 as shown in FIG. 2. The input unit 150 may be configured in combination with the display unit 110. For example, the input may represent a touch-screen interface of the display unit 110. The input unit 150 may be a keyboard. The input unit 150 is usable by a driver of the vehicle. There may be scenarios wherein the control unit 140 cannot determine with sufficient accuracy whether or not a near-miss event has occurred. For example, there sensor information provided to the control unit 140 may indicate a sharp decrease in speed but not sharp enough to exceed the pre-defined threshold or just over the threshold. In this case, the display unit 110 may display a message to the driver. The display unit 110 may ask the driver whether a near-miss event just occurred. The driver may respond to the message using the input unit 150. If the driver provides an indication that a near-miss event did occur, then the control unit 140 may proceed to instruct the communication unit 160 to transmit the notification to the notification target. In some embodiments, when the control unit 140 determines that a near miss event has occurred. The display unit 110 may provide a message to the driver asking whether or not to transmit the notification to the notification target or not. This may occur for example, in a case where the driver may have been at fault for the near-miss event.

In some embodiments, the communication device 200 may be configured to prioritize a signal containing the notification transmitted by the communication unit of the vehicle apparatus. For example the communication unit may include a flag in a header of the signal containing the notification. The communication device may interpret the flag as meaning that the signal is a priority signal. For example, the communication device may cease all communications which it is currently engaged in to receive the notification.

Figure 12:
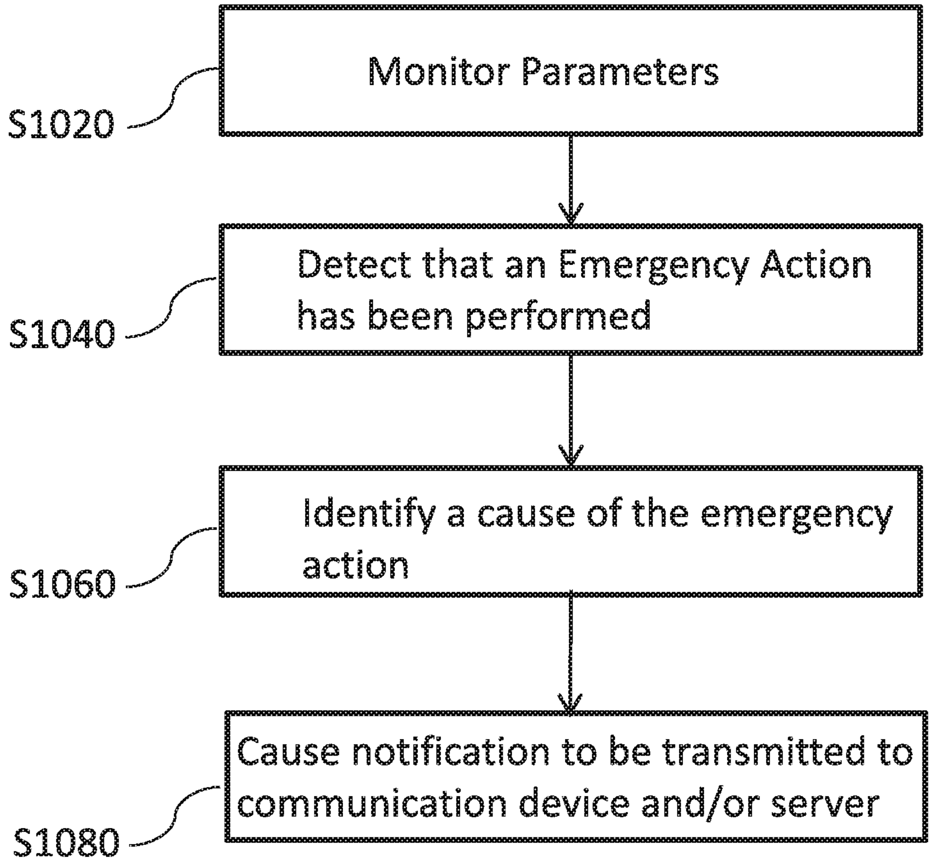
FIG. 12 is a flow diagram illustrating an example of a processing procedure carried out by the vehicle apparatus according to exemplary embodiments.

FIG. 12 is a flow diagram illustrating a sequence of events according to some embodiments. In step S1020, the control unit 140 unit monitors one or more parameters which may include images of the region surrounding the vehicle captured by one or more cameras 122 on the vehicle, distance information regarding distances to objects in a region surrounding the vehicle and/or acceleration information regarding changes in speed and direction of the vehicle. In step S1040, the control unit determines whether or not an emergency action has been performed. The control unit may determine that an emergency action has been performed, for example, due to a sharp change in direction or a sharp change in speed. If the control unit determines that an emergency action has occurred, then processing proceeds to step S1060. The control unit 140 then determines a cause of the emergency action. The cause of the emergency action may be determined based on a combination of the received images of the region surrounding the vehicle and the distance information received at the time at which the emergency action occurred. The control unit 140 may then determine if the determined cause of the emergency action is a potential notification target. A potential notification target is a pedestrian, cyclist or driver of a vehicle or the like who may be recognized using object recognition software. Additionally, a potential notification target is within a pre-defined distance of the vehicle at the time at which the emergency action was performed. If a notification target is determined (for example, a pedestrian, cyclist or driver is recognized and is within the pre-defined distance of the vehicle at the time at which the emergency action was performed), then the control unit determines that a near-miss event occurred and that the notification target was a cause of the emergency action. Processing proceeds to step S1080 in which the control unit 140 causes the notification to be transmitted. In accordance with the examples outlined above, the notification may be directly transmitted to a communication device of the pedestrian or transmitted indirectly to the communication device of the pedestrian via street furniture, a gNB and/or a server.

In example embodiments, after the control unit 140 determines a likely cause of the emergency action (for example, a pedestrian), the control unit 140 may further determine that pedestrian may have deliberately caused the emergency action to be performed. For example, the pedestrian may be an individual who is a criminal and/or is attempting to perform insurance fraud by deliberately causing an accident. For example, the pedestrian may deliberately walk out in front of the car when the car is close to cause the car to suddenly brake or swerve. In such cases, the image information containing one or more images of a region surrounding the car at a time at which the emergency action occurred may be analysed for suspicious activity either by the control unit or by the server if the images are provided to the server. For example, the analysis may comprise gait analysis and the control unit or server may determine that the behaviour of the pedestrian around the time at which the emergency action occurred was suspicious. In response to this determination, the control unit or server may store the one or more images at the time at which the emergency action occurred and/or transmit the images to a third party. The third party may be the local police force or an insurance company for example.

In some embodiments, the one or more cameras may take images before the emergency action occurs. In such embodiments, the images may be analysed for suspicious activity. For example the control unit may perform gait analysis on the one or more images to determine suspicious activity (for example, a pedestrian may be deliberately attempting to stop the vehicle). In such embodiments, if it is determined that there is suspicious activity, then the control unit may instruct the vehicle to perform a security action. For example, the control unit may lock the car doors, instruct electronically controlled windows to close and/or instruct the car to drive off if it is safe to do so.

In some embodiments, the control unit may perform an emergency action if a collision with the vehicle is not detected. This will be explained below with reference to FIG. 13.

Figure 13:
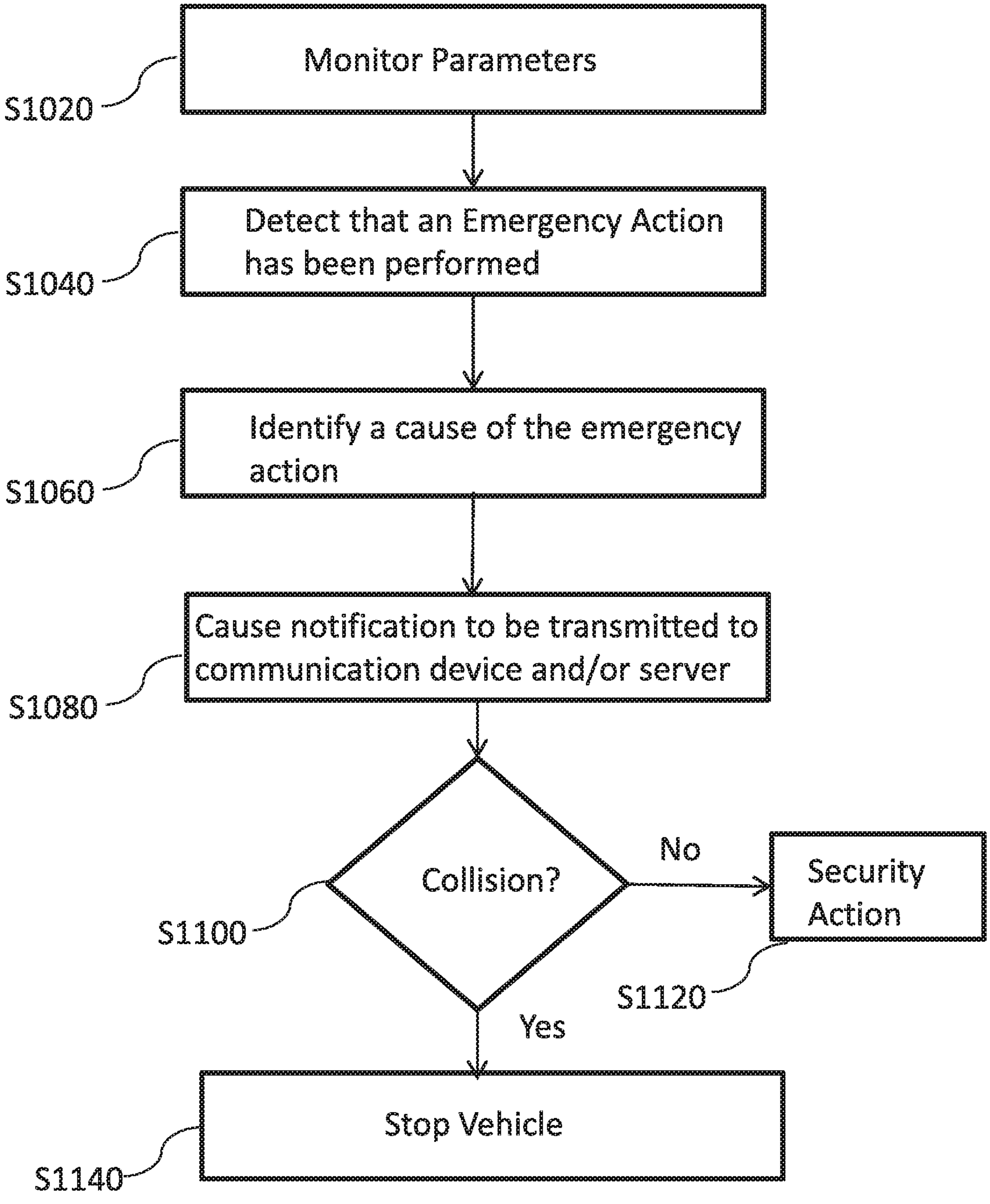
FIG. 13 is a flow diagram illustrating an example of a processing procedure carried out by the vehicle apparatus according to exemplary embodiments.

FIG. 13 is a flow diagram illustrating a sequence of events according to some embodiments. Steps S1020, S1040, S1060 and S1080 have been explained with reference to FIG. 12. In step S1100, the control unit may determine whether or not a collision has occurred with the vehicle. The vehicle may have impact sensors configured to detect an impact with an external object for example. Alternatively, the control unit may use the one or more images taken at the time at which the emergency action occurred to determine if a collision occurred for example. If it is determined that a collision has occurred, then processing proceeds to step S1140 wherein the vehicle may stop to prevent a driver of the vehicle from being in a hit and run incident. For example, the control unit may instruct a braking unit to engage AEB. However, if the vehicle detects that no collision has occurred then processing proceeds to step S1120. In step S1120, the vehicle may perform one or more security actions as a precautionary measure. The security actions may include the control unit instructing doors of the vehicle to lock, instructing electronically controlled windows of the vehicle to close and/or instructing the vehicle to drive off if it is safe to do so. Performing security actions if no collision is detected may improve driver safety. For example, a pedestrian (such as a criminal) may have deliberately jumped out in front of a car to cause it to perform an emergency action. The pedestrian may have done this to attempt to hijack the vehicle or kidnap occupants of the vehicle for example. In this case, if a security action is performed in view of no collision, then driver safety is improved.

The following numbered paragraphs provide further example aspects and features of the present technique:

Paragraph 1. A method of notifying a target that the target was a likely cause of an emergency action performed by a vehicle, the method comprising monitoring, by control circuitry in the vehicle, one or more parameters of the vehicle indicating a motion of the vehicle, detecting, by the control circuitry based on the monitored parameters, that an emergency action has been performed by the vehicle to avoid a collision, identifying, by the control circuitry, that an object in a region surrounding the vehicle was a likely cause of the emergency action, the object being a notification target, causing, by the control circuitry in combination with transmitter circuitry in the vehicle, a notification to be transmitted to at least one of a communication device of the notification target or a server indicating that the notification target was the likely cause of the emergency action.

Paragraph 2. A method according to paragraph 1, comprising recording, using an imaging apparatus in the vehicle, one or more images of a region surrounding the vehicle at a time at which the emergency action occurred, wherein the identifying the object as a likely cause of the emergency action comprises in response to detecting that an emergency action has occurred, identifying, by the control circuitry, the object from the one or more recorded images at the time at which the emergency action occurred.

Paragraph 3. A method according to paragraph 2, comprising recording, using one or more distance sensors in the vehicle, a distance of one or more objects in the region surrounding the vehicle from the vehicle, wherein the identifying the object as a likely cause of the emergency action comprises using the recorded distances of the one or more objects in the region surrounding the vehicle at the time at which the emergency action occurred in combination with the one or more recorded images.

Paragraph 4. A method according to any of paragraphs 1 to 3, wherein the monitored parameters include one or more of: an acceleration of the vehicle measured by an accelerometer in the vehicle, and a direction of the vehicle measured by a direction sensor in the vehicle.

Paragraph 5. A method according to paragraph 4, wherein the detecting, by the control circuitry, that the emergency action has been performed comprises detecting that a rate of change of speed or acceleration with respect to time measured by the accelerometer is above a pre-defined threshold.

Paragraph 6. A method according to paragraph 4, wherein the detecting, by the control circuitry, that the emergency action has been performed comprises detecting that a rate of change of direction of the vehicle with respect to time measured by the direction sensor is above a pre-defined threshold.

Paragraph 7. A method according to any of paragraphs 1 to 6, wherein the causing, the control circuitry in combination with transmitter circuitry in the vehicle, the notification to be transmitted to the at least one of a communication device of the notification target or the server indicating that the notification target was the likely cause of the emergency action comprises determining a position of the notification target at a time after the emergency action has occurred by recording, using the imaging apparatus in the vehicle, one or more updated images of the region surrounding the vehicle at the time after the emergency action has occurred, recording, using the one or more distance sensors in the vehicle, an updated distance between the vehicle and the objects the region surrounding the vehicle at a time after the emergency action has occurred, recording, using a location sensor in the vehicle, a location of the vehicle at the time after the emergency action has occurred, and using, by the control circuitry, the one or more updated images, the updated distances and the location of the vehicle at the time after the emergency action has occurred to determine the position of the notification target.

Paragraph 8. A method according to paragraph 7, wherein the causing, the control circuitry in combination with transmitter circuitry in the vehicle, the notification to be transmitted to the at least one of a communication device of the notification target or the server indicating that the notification target was the likely cause of the emergency action comprises pairing with the at least one communication device using a short range wireless communications technology standard using the control circuitry in combination with transmitter and receiver circuitry in the vehicle.

Paragraph 9. A method according to paragraph 8, wherein the causing, the control circuitry in combination with transmitter circuitry in the vehicle, the notification to be transmitted to the at least one of a communication device of the notification target or the server indicating that the notification target was the likely cause of the emergency action comprises receiving, from the at least one communications device after the pairing, a location of the communications device together with a MAC address of the communications device using receiver circuitry in the vehicle.

Paragraph 10. A method according to paragraph 7, wherein the causing, the control circuitry in combination with transmitter circuitry in the vehicle, the notification to be transmitted to the at least one of a communication device of the notification target or the server indicating that the notification target was the likely cause of the emergency action comprises registering with a modem/router installed in street furniture configured to support a wireless communications technology standard using the control circuitry in combination with transmitter and receiver circuitry in the vehicle.

Paragraph 11. A method according to paragraph 10, wherein the causing, the control circuitry in combination with transmitter circuitry in the vehicle, the notification to be transmitted to the at least one of a communication device of the notification target or the server indicating that the notification target was the likely cause of the emergency action comprises receiving, from the at least one communications device via the street furniture after the registration, a location of the communications device together with a MAC address of the communications device using receiver circuitry in the vehicle.

Paragraph 12. A method according to any paragraphs 9 or 11, wherein the causing, the control circuitry in combination with transmitter circuitry in the vehicle, the notification to be transmitted to the at least one of a communication device of the notification target or the server indicating that the notification target was the likely cause of the emergency action comprises determining, by the control circuitry, on a basis of the determined position of the notification target and the received location and MAC address of the communication device, that the communications device belongs to the notification target.

Paragraph 13. A method according to paragraph 12, wherein the causing, the control circuitry in combination with transmitter circuitry in the vehicle, the notification to be transmitted to the at least one of a communication device of the notification target or the server indicating that the notification target was the likely cause of the emergency action comprises transmitting the notification to the communications device belonging to the notification target using the short range wireless communications technology standard.

Paragraph 14. A method according to paragraph 12, wherein the causing, the control circuitry in combination with transmitter circuitry in the vehicle, the notification to be transmitted to the at least one of a communication device of the notification target or the server indicating that the notification target was the likely cause of the emergency action comprises transmitting the notification to the communications device belonging to the notification target via the modem/router in the street furniture.

Paragraph 15. A method according to any of paragraphs 1 to 14, wherein the causing, the control circuitry in combination with transmitter circuitry in the vehicle, the notification to be transmitted to the at least one of a communication device of the notification target or the server indicating that the notification target was the likely cause of the emergency action comprises transmitting, using the transmitter circuitry in combination with the control circuitry, the notification together with the one or more recorded images of the region surrounding the vehicle at the time at which the emergency action occurred and the determined position of the notification target to a server via an infrastructure equipment connected to a core network, the server using the notification, recorded images and determined position to determine a MAC address of the at least one communications device.

Paragraph 16. A method according to paragraph 15, wherein the notification transmitted to the server includes an indication to transmit the notification to one or more other communication devices belonging to concerned parties of the notification target.

Paragraph 17. A method according to paragraph 16, wherein the server provides a subscription based services for vehicles and communications devices for transmitting the notification to the notification target.

Paragraph 18. A method according to any of paragraphs 1 to 17, wherein the causing, the control circuitry in combination with transmitter circuitry in the vehicle, the notification to be transmitted to the at least one of a communication device of the notification target or the server indicating that the notification target was the likely cause of the emergency action comprises beamforming the notification to the communication device.

Paragraph 19. A method according to any of paragraphs 1 to 18, wherein the causing, the control circuitry in combination with transmitter circuitry in the vehicle, the notification to be transmitted to the at least one of a communication device of the notification target or the server indicating that the notification target was the likely cause of the emergency action comprises transmitting the notification to the communication device via the infrastructure equipment using an Ultra-Reliable Low-Latency Communication (URLLC) service.

Paragraph 20. A method according to any of paragraphs 2 to 19, wherein the notification includes the one or more recorded images at the time at which the emergency action occurred.

Paragraph 21. A method according to any of paragraphs 1 to 20, wherein the causing, the control circuitry in combination with transmitter circuitry in the vehicle, the notification to be transmitted to the at least one of a communication device of the notification target or the server indicating that the notification target was the likely cause of the emergency action comprises broadcasting the notification to the one or more communication devices in the region surrounding the vehicle including the communication device of the notification target using the control circuitry in combination with the transmitter circuitry.

Paragraph 22. A method according to any of paragraphs 1 to 21, wherein the object in the region surrounding the vehicle which is the likely cause of the emergency action is a first of a plurality of objects in the region surrounding the vehicle and the identifying, by the control circuitry, that the object in the region surrounding the vehicle was a likely cause of the emergency action, comprises identifying by the control circuitry, the plurality of objects in the region surrounding the vehicle;

assigning, by the control circuitry, a probability for each of the plurality of objects indicating a likelihood that each object was the likely cause of the emergency action;

determining, by the control circuitry, that the first of the plurality of objects is a most likely cause of the emergency action on a basis of the assigned probabilities.

Paragraph 23. A method according to 22, comprising receiving, by receiver circuitry from the communication device of the notification target, an indication that the notification target was not a cause of the emergency action;

causing, by the control circuitry in combination with transmitter circuitry in the vehicle on a basis of the assigned probabilities, a second notification to be transmitted to at least one of a communication device of a second of the plurality of objects in the region surrounding the vehicle to which a probability was assigned or the server indicating that the second object is the most likely cause of the emergency action.

Paragraph 24. A method according to any of paragraphs 1 to 23, wherein the detecting, by the control circuitry based on the monitored parameters, that an emergency action has been performed by the vehicle to avoid the collision, comprises detecting, by the control circuitry, that a collision did not occur;

instructing, by the control circuitry, one or more security actions to be performed including one or more of: instructing one or more doors of the vehicle to lock, instructing one or more windows of the vehicle to close or instructing the vehicle to drive.

Paragraph 25. An apparatus in a vehicle for notifying a target that the target was a likely cause of an emergency action performed by the vehicle, the apparatus comprising control circuitry configured to to monitor one or more parameters of the vehicle indicating a motion of the vehicle, to detect, based on the monitored parameters, that an emergency action has been performed by the vehicle to avoid a collision, to identify, that an object in a region surrounding the vehicle was a likely cause of the emergency action, the object being a notification target, and the control circuitry being configured in combination with transmitter circuitry in the vehicle to cause a notification to be transmitted to at least one of a communication device of the notification target or a server indicating that the notification target was the likely cause of the emergency action.

Paragraph 26. An apparatus according to paragraph 25, comprising an imaging apparatus configured to record one or more images of the region surrounding the vehicle at a time at which the emergency action occurred, and the control circuitry is configured to identify the object as the likely cause of the emergency action by detecting that the emergency action has occurred, and identifying the object from the one or more recorded images at the time at which the emergency action occurred.

Paragraph An apparatus according to paragraph 25 or 26, comprising one or more distance sensors configured to record a distance of one or more objects in the region surrounding the vehicle from the vehicle, and the control circuitry is configured to identify the object as the likely cause of the emergency action by using the recorded distances of the one or more objects in the region surrounding the vehicle at the time at which the emergency action occurred in combination with the one or more recorded images.

Paragraph 28. An apparatus according to paragraph 25, 26 or 27, comprising one or both of an accelerometer configured to monitor an acceleration of the vehicle as one of the monitored parameters, and a direction sensor configured to monitor a direction sensor in the vehicle as one of the monitored parameters.

Paragraph 29. An apparatus according to paragraph 28, wherein the control circuitry is configured to detect that the emergency action has been occurred by detecting that a rate of change of speed or acceleration with respect to time measured by the accelerometer is above a pre-defined threshold.

Paragraph 30. An apparatus according to paragraph 28, wherein the control circuitry is configured to detect that the emergency action has been occurred by detecting that a rate of change of direction of the vehicle with respect to time measured by the direction sensor is above a pre-defined threshold.

Paragraph 31. An apparatus according to any of paragraphs 25 to 30, comprising one or more location sensors configured to record a location of the vehicle, and the control circuitry is configured in combination with the transmitter circuitry in the vehicle to cause the notification to be transmitted to the at least one of a communication device of the notification target or the server indicating that the notification target was the likely cause of the emergency action by determining a position of the notification target at a time after the emergency action has occurred by recording, using the imaging apparatus in the vehicle, one or more updated images of the region surrounding the vehicle at the time after the emergency action has occurred, recording, using the one or more distance sensors in the vehicle, an updated distance between the vehicle and the objects the region surrounding the vehicle at a time after the emergency action has occurred, recording, using a location sensor in the vehicle, a location of the vehicle at the time after the emergency action has occurred, and using, by the control circuitry, the one or more updated images, the updated distances and the location of the vehicle at the time after the emergency action has occurred to determine the position of the notification target.

Paragraph 32. An apparatus according to paragraph 31, comprising receiver circuitry configured to receive signals and the receiver circuitry is configured in combination with the transmitter circuitry and the control circuitry to cause a notification to be transmitted to at least one of a communication device of the notification target or a server indicating that the notification target was the likely cause of the emergency action by pairing with the at least one communication device using a short range wireless communications technology standard and receiving, from the at least one communications device after the pairing, a location of the communications device together with a MAC address of the communications device.

Paragraph 33. An apparatus according to paragraph 31, comprising receiver circuitry configured to receive signals and the receiver circuitry is configured in combination with the transmitter circuitry and the control circuitry to cause a notification to be transmitted to at least one of a communication device of the notification target or a server indicating that the notification target was the likely cause of the emergency action by registering with a modem/router installed in street furniture configured to support a wireless communications technology standard, and receiving, from the at least one communications device via the street furniture after the registration, a location of the communications device together with a MAC address of the communications device using receiver circuitry in the vehicle.

Paragraph 34. An apparatus according to any paragraphs 32 or 33, wherein the control circuitry is configured to determine on, a basis of the determined position of the notification target and the received location and MAC address of the communication device, that the communications device belongs to the notification target.

Paragraph 35. An apparatus according to paragraph 34, wherein the control circuitry is configured in combination with transmitter circuitry in the vehicle, to cause the notification to the at least one of a communication device of the notification target or the server indicating that the notification target was the likely cause of the emergency action by transmitting the notification to the communications device belonging to the notification target using the short range wireless communications technology standard.

Paragraph 36. An apparatus according to paragraph 34, wherein the control circuitry is configured in combination with transmitter circuitry in the vehicle, to cause the notification to be transmitted to the at least one of a communication device of the notification target or the server indicating that the notification target was the likely cause of the emergency action by transmitting the notification to the communications device belonging to the notification target via the modem/router in the street furniture.

Paragraph 37. An apparatus according to any of paragraphs 25 to 36 wherein the control circuitry is configured in combination with transmitter circuitry and the imaging apparatus to transmit the notification together with the one or more recorded images of the region surrounding the vehicle at the time at which the emergency action occurred and the determined position of the notification target to a server via an infrastructure equipment connected to a core network, the server using the notification, recorded images and determined position to determine a MAC address of the at least one communications device.

Paragraph 38. An apparatus according to paragraph 37, wherein the notification transmitted to the server includes an indication to transmit the notification to one or more other communication devices belonging to concerned parties of the notification target.

Paragraph 39. An apparatus according to paragraph 38, wherein the server provides a subscription based services for vehicles and communications devices for transmitting the notification to the notification target.

Paragraph 40. An apparatus according to any of paragraphs 25 to 39, wherein the control circuitry is configured in combination with the transmitter circuitry to cause the notification to be transmitted to the communications device by beamforming the notification to the communication device.

Paragraph 41. An apparatus according to any of paragraphs 25 to 39, wherein the control circuitry is configured in combination with the transmitter circuitry to cause the notification to be transmitted to the communications device by transmitting the notification to the communication device via the infrastructure equipment using an Ultra-Reliable Low-Latency Communication (URLLC) service.

Paragraph 42. An apparatus according to any of paragraphs 26 to 41, wherein the notification includes the one or more recorded images at the time at which the emergency action occurred.

Paragraph 43. An apparatus according to any of paragraphs 25 to 42, wherein the control circuitry is configured in combination with the transmitter circuitry to cause the notification to be transmitted to the communications device by broadcasting the notification to the one or more communication devices in the region surrounding the vehicle including the communication device of the notification target.

Paragraph 44. An apparatus according to any of paragraphs 25 to 43, wherein the object in the region surrounding the vehicle which is the likely cause of the emergency action is a first of a plurality of objects in the region surrounding the vehicle and the control circuitry is configured to identify that the object in the region surrounding the vehicle was a likely cause of the emergency action by identifying the plurality of objects in the region surrounding the vehicle;

assigning a probability for each of the plurality of objects indicating a likelihood that each object was the likely cause of the emergency action;

determining that the first of the plurality of objects is a most likely cause of the emergency action on a basis of the assigned probabilities.

Paragraph 45. An apparatus according to paragraph 44, wherein the receiver circuitry is configured in combination with the control circuitry to receiver, from the communication device of the notification target, an indication that the notification target was not a cause of the emergency action; and the transmitter circuitry is configured in combination with the control circuitry to cause, on a basis of the assigned probabilities, a second notification to be transmitted to at least one of a communication device of a second of the plurality of objects in the region surrounding the vehicle to which a probability was assigned or the server indicating that the second object is the most likely cause of the emergency action.

Paragraph 46. An apparatus according to any of paragraphs 25 to 45, wherein the detecting, by the control circuitry based on the monitored parameters, that an emergency action has been performed by the vehicle to avoid the collision, comprises detecting, by the control circuitry, that a collision did not occur;

instructing, by the control circuitry, one or more security actions to be performed including one or more of: instructing one or more doors of the vehicle to lock, instructing one or more windows of the vehicle to close or instructing the vehicle to drive.

Paragraph 47. A vehicle including the apparatus according to any of paragraphs 25 to 46.

Paragraph 48. An apparatus for controlling a vehicle, the apparatus comprising control circuitry having a processor for executing program code and program code which when executed causes the control circuitry to perform the method according to any of paragraphs 1 to 24.

Paragraph 49. A server for notifying a target that the target was a likely cause of an emergency action performed by a vehicle, the server comprising receiver circuitry, configured in combination with control circuitry, to receive a notification from the vehicle that an object in a region surrounding the vehicle was a likely cause of the emergency action, the object being a notification target;

transmitter circuitry, configured in combination with the control circuitry, to transmit the notification to a communications device of the notification target indicating that the notification target was the likely cause of the emergency action.

Paragraph 50. A system including a vehicle according to paragraph 47 and a server according to paragraph 49.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] European Telecommunications Standard Institute (ETSI), "Non-IP Networking (NIN)", [Online], Accessed July 2020, Available from: https://www.etsi.org/technologies/non-ip-networking.

What is claimed is:

1. A method of notifying a target that the target was a likely cause of an emergency action performed by a vehicle, the method comprising monitoring, by control circuitry in the vehicle, one or more parameters of the vehicle indicating a motion of the vehicle, detecting, by the control circuitry based on the monitored parameters, that an emergency action has been performed by the vehicle to avoid a collision, identifying, by the control circuitry and in response to the emergency action being performed, that an object in a region surrounding the vehicle was a likely cause of the emergency action performed, the object being a notification target, and transmitting, with transmitter circuitry in the vehicle using vehicle to pedestrian communication, a notification to a communication device of the notification target indicating that the notification target was the likely cause of the emergency action performed, wherein the notification target is a pedestrian.

2. The method according to claim 1, comprising recording, using an imaging apparatus in the vehicle, one or more images of a region surrounding the vehicle at a time at which the emergency action occurred, wherein the identifying the object as a likely cause of the emergency action comprises in response to detecting that an emergency action has occurred, identifying, by the control circuitry, the object from the one or more recorded images at the time at which the emergency action occurred.

3. The method according to claim 2, comprising recording, using one or more distance sensors in the vehicle, a distance of one or more objects in the region surrounding the vehicle from the vehicle, wherein the identifying the object as a likely cause of the emergency action comprises using the recorded distances of the one or more objects in the region surrounding the vehicle at the time at which the emergency action occurred in combination with the one or more recorded images.

4. The method according to claim 3, wherein the monitored parameters include one or more of: an acceleration of the vehicle measured by an accelerometer in the vehicle, and a direction of the vehicle measured by a direction sensor in the vehicle.

5. The method according to claim 4, wherein the detecting, by the control circuitry, that the emergency action has been performed comprises detecting that a rate of change of speed or acceleration with respect to time measured by the accelerometer is above a pre-defined threshold or detecting that a rate of change of direction of the vehicle with respect to time measured by the direction sensor is above a pre-defined threshold.

6. The method according to claim 5, wherein causing the notification to be transmitted comprises:

determining a position of the notification target at a time after the emergency action has occurred by recording, using the imaging apparatus in the vehicle, one or more updated images of the region surrounding the vehicle at the time after the emergency action has occurred, recording, using the one or more distance sensors in the vehicle, an updated distance between the vehicle and the objects the region surrounding the vehicle at a time after the emergency action has occurred, recording, using a location sensor in the vehicle, a location of the vehicle at the time after the emergency action has occurred, and using, by the control circuitry, the one or more updated images, the updated distances and the location of the vehicle at the time after the emergency action has occurred to determine the position of the notification target.

7. The method according to claim 6, wherein causing the notification to be transmitted comprises pairing with the at least one communication device using a short range wireless communications technology standard using the control circuitry in combination with transmitter and receiver circuitry in the vehicle.

8. The method according to claim 6, wherein causing the notification to be transmitted comprises registering with a modem/router installed in street furniture configured to support a wireless communications technology standard using the control circuitry in combination with transmitter and receiver circuitry in the vehicle.

9. The method according to claim 8, wherein causing the notification to be transmitted comprises receiving, from the at least one communications device via the street furniture after the registration, a location of the communications device together with a MAC address of the communications device using receiver circuitry in the vehicle.

10. The method according to claim 9, wherein causing the notification to be transmitted comprises determining, by the control circuitry, on a basis of the determined position of the notification target and the received location and MAC address of the communication device, that the communications device belongs to the notification target.

11. The method according to claim 10, wherein causing the notification to be transmitted comprises transmitting the notification to the communications device belonging to the notification target using the short range wireless communications technology standard.

12. The method according to claim 10, wherein causing the notification to be transmitted comprises transmitting the notification to the communications device belonging to the notification target via the modem/router in the street furniture.

13. The method according to claim 12, wherein causing the notification to be transmitted comprises transmitting, using the transmitter circuitry in combination with the control circuitry, the notification together with the one or more recorded images of the region surrounding the vehicle at the time at which the emergency action occurred and the determined position of the notification target to a server via an infrastructure equipment connected to a core network, the server using the notification, recorded images and determined position to determine a MAC address of the at least one communications device.

14. The method according to claim 13, wherein the notification transmitted to the server includes an indication to transmit the notification to one or more other communication devices belonging to concerned parties of the notification target.

15. The method according to claim 14, wherein the server provides subscription based services for vehicles and communications devices for transmitting the notification to the notification target.

16. An apparatus in a vehicle for notifying a target that the target was a likely cause of an emergency action performed by the vehicle, the apparatus comprising control circuitry configured to:

monitor one or more parameters of the vehicle indicating a motion of the vehicle;

detect, based on the monitored parameters, that an emergency action has been performed by the vehicle to avoid a collision;

identify, in response to detection of the emergency action performed by the vehicle, that an object in a region surrounding the vehicle was a likely cause of the emergency action performed, the object being a notification target; and transmit, with the transmitter circuitry in the vehicle using vehicle to pedestrian communication, a notification to a communication device of the notification target indicating that the notification target was the likely cause of the emergency action performed, wherein the notification target is a pedestrian.

17. The apparatus according to claim 16, comprising an imaging apparatus configured to record one or more images of the region surrounding the vehicle at a time at which the emergency action occurred, and the control circuitry is configured to identify the object as the likely cause of the emergency action by detecting that the emergency action has occurred, and identifying the object from the one or more recorded images at the time at which the emergency action occurred.

18. The apparatus according to claim 16, comprising one or more distance sensors configured to record a distance of one or more objects in the region surrounding the vehicle from the vehicle, and the control circuitry is configured to identify the object as the likely cause of the emergency action by using the recorded distances of the one or more objects in the region surrounding the vehicle at the time at which the emergency action occurred in combination with the one or more recorded images.

19. A vehicle including the apparatus according to claim 16.

* * * * *